United States Patent [19]

Vago et al.

[11] Patent Number: 5,158,200
[45] Date of Patent: Oct. 27, 1992

[54] TANK CONNECTOR CONSTRUCTION AND METHOD OF FABRICATION

[75] Inventors: Otto Z. Vago, Burns; Rolf E. Faber, Clarksville, both of Tenn.

[73] Assignee: State Industries, Inc., Ashland City, Tenn.

[21] Appl. No.: 712,301

[22] Filed: Jun. 7, 1991

Related U.S. Application Data

[63] Continuation-in-part of Ser. No. 330,118, Mar. 29, 1989, abandoned.

[51] Int. Cl.⁵ .............................................. B65D 25/16
[52] U.S. Cl. .................................. 220/465; 220/256; 220/289; 220/661; 264/310
[58] Field of Search .............. 220/465, 288, 289, 256, 220/403, 408, 601, 661; 264/516, 503, 310, 311, 312

[56] References Cited

U.S. PATENT DOCUMENTS

| | | | |
|---|---|---|---|
| 611,003 | 9/1898 | Roth | 220/465 |
| 2,013,325 | 9/1935 | Wilkins | 220/465 |
| 2,987,216 | 6/1961 | Fletcher | 220/465 |
| 3,160,691 | 12/1964 | Chupa | 264/310 |
| 3,377,766 | 4/1968 | Nelson | 220/403 |
| 3,981,955 | 9/1976 | Otani et al. | 264/310 |
| 4,023,257 | 5/1977 | Wright et al. | 264/310 |
| 4,323,411 | 4/1982 | Uhlig | 264/516 |
| 4,342,799 | 8/1982 | Schwochert | 264/516 |
| 4,635,814 | 1/1987 | Jones | 220/403 |
| 4,865,220 | 9/1989 | Weigand | 220/465 |

FOREIGN PATENT DOCUMENTS 973431 10/1964 United Kingdom ................ 264/310

*Primary Examiner*—Stephen Marcus
*Assistant Examiner*—S. Castellano
*Attorney, Agent, or Firm*—Paul R. Puerner

[57] ABSTRACT

A tank connector construction for a tank. The tank is comprised of an outer shell of metal material and an inner shell of non-corrosive and non-metallic material mounted inside the outer shell. A metal connector fitting is provided which has an internal threaded body portion, an internal groove and a weld projection portion on the inner end thereof. The weld projection portion of the fitting is welded to the outer shell of the tank. A sleeve member of non-corrosive and non-metallic material is mounted in the internal groove of the connector fitting. An extension portion of non-corrosive and non-metallic material is formed integrally with the inner shell of the tank and is fused to the material of the sleeve to prevent contact between the contents of the tank and the outer shell of the tank. The extension portion of non-corrosive and non-metallic material has a threaded portion which forms a continuation of the internal threaded body portion of the metal connector fitting.

6 Claims, 30 Drawing Sheets

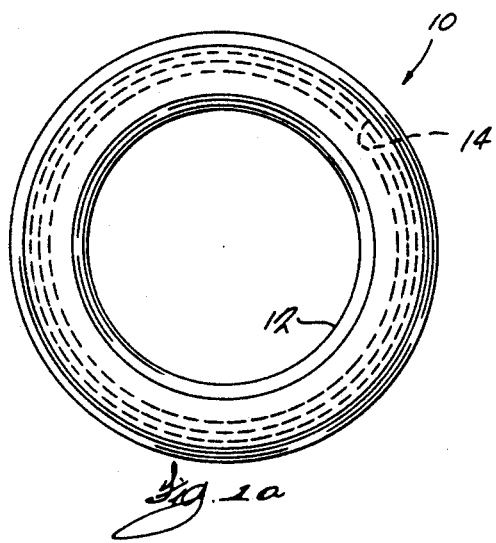
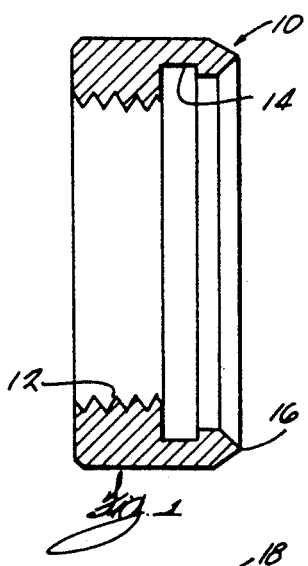
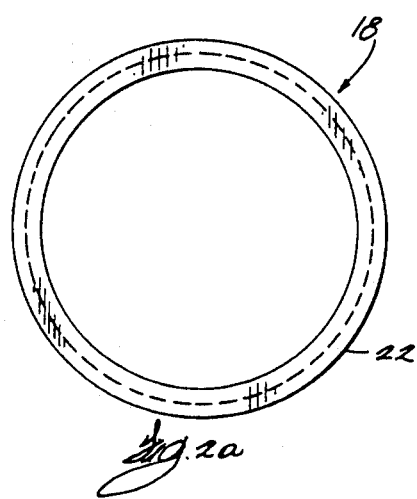
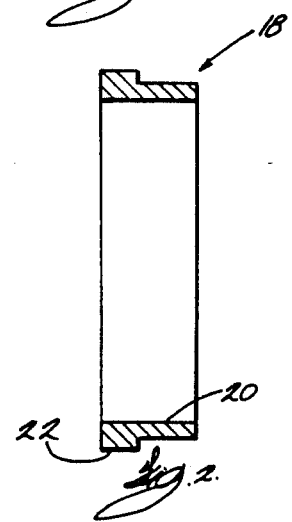
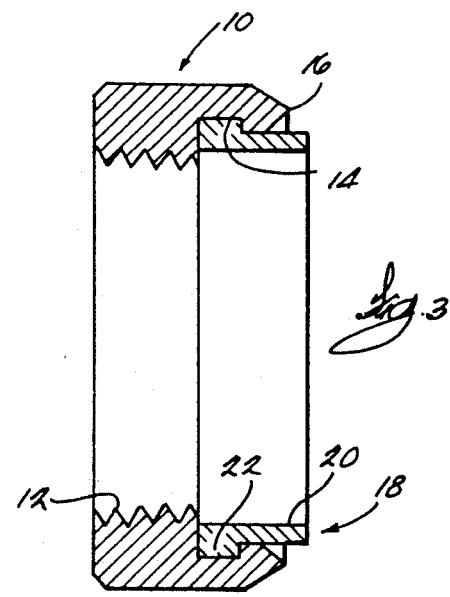
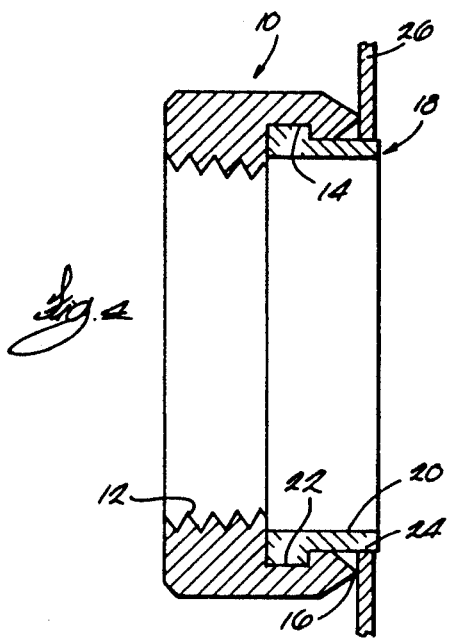

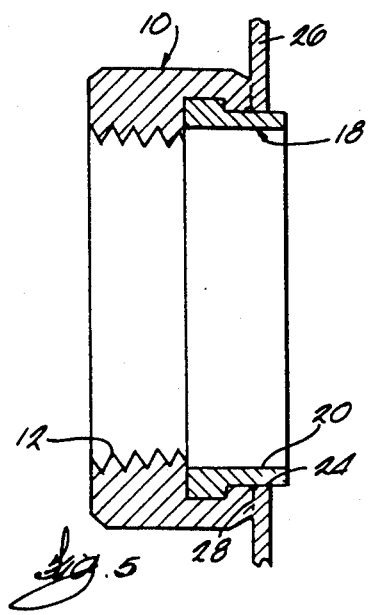
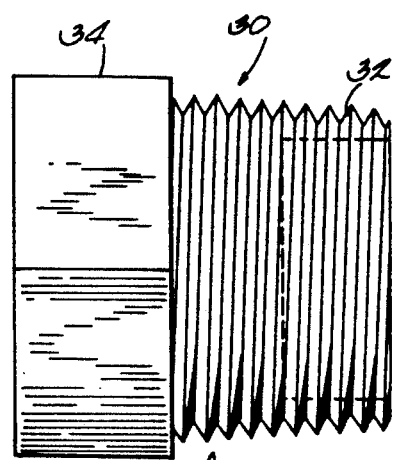
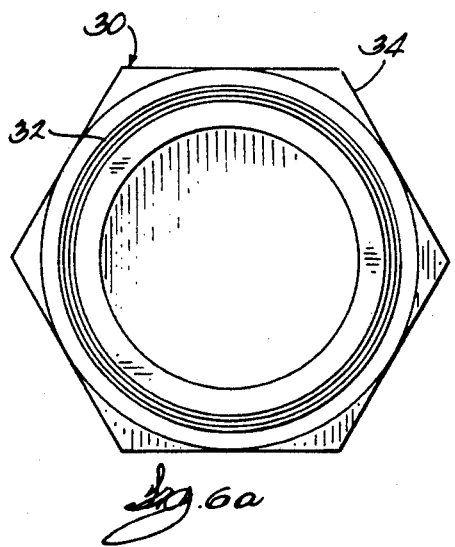
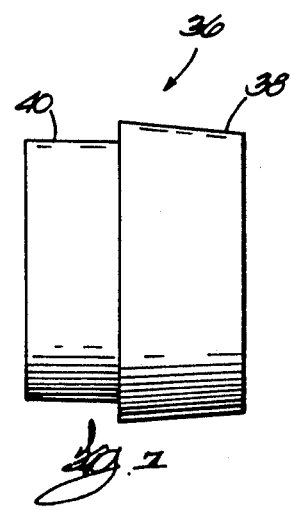
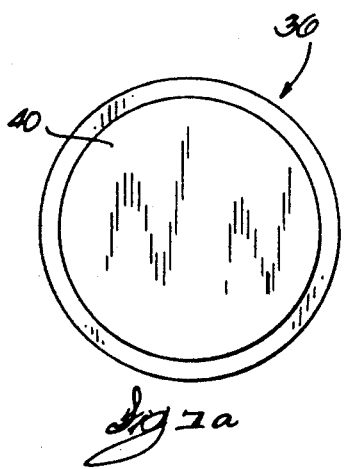
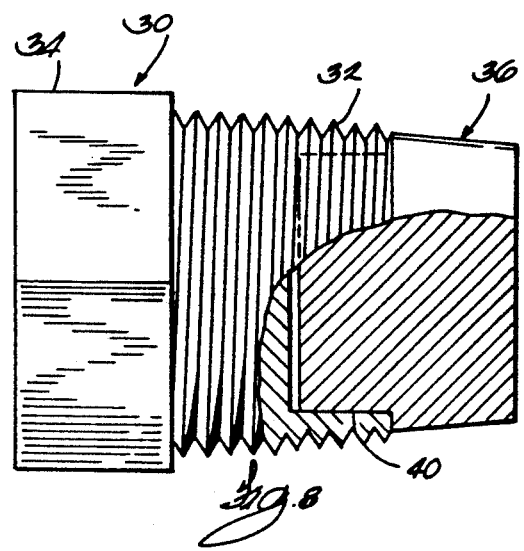

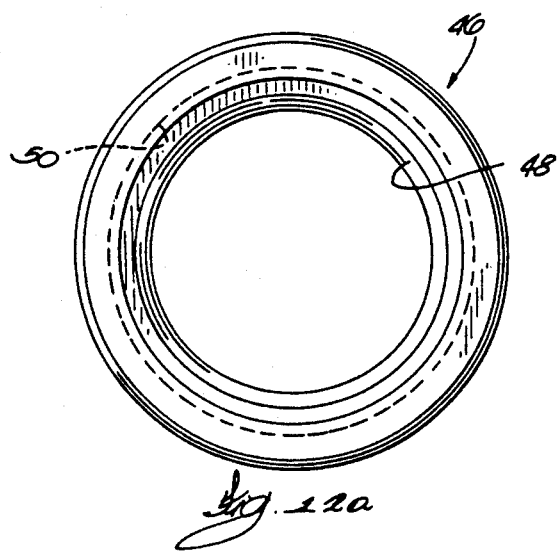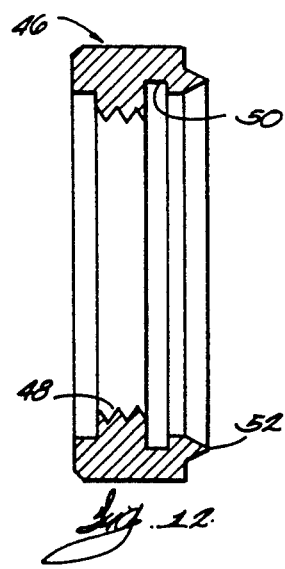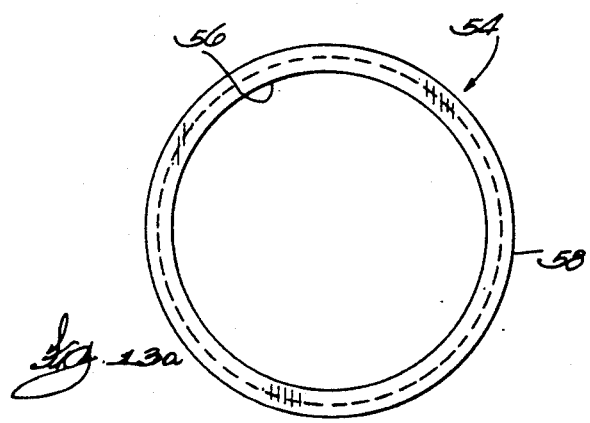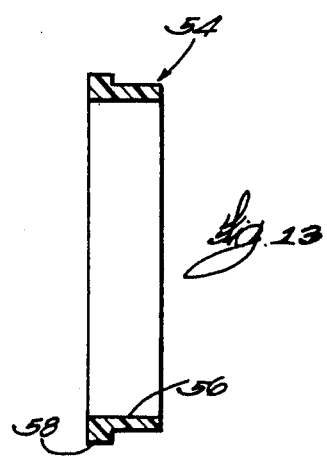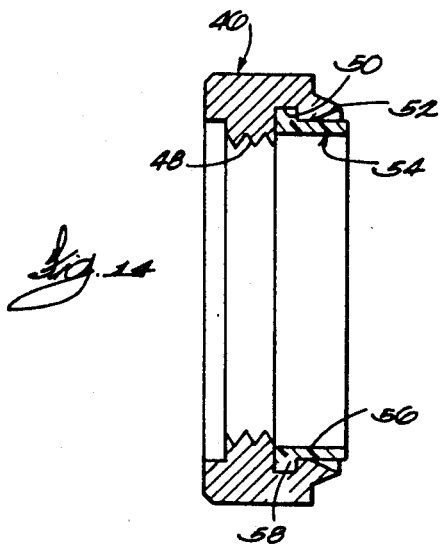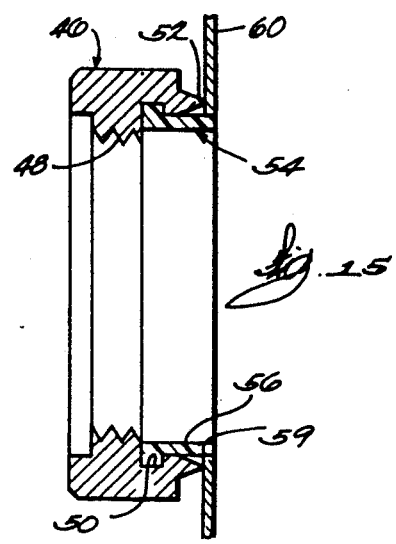

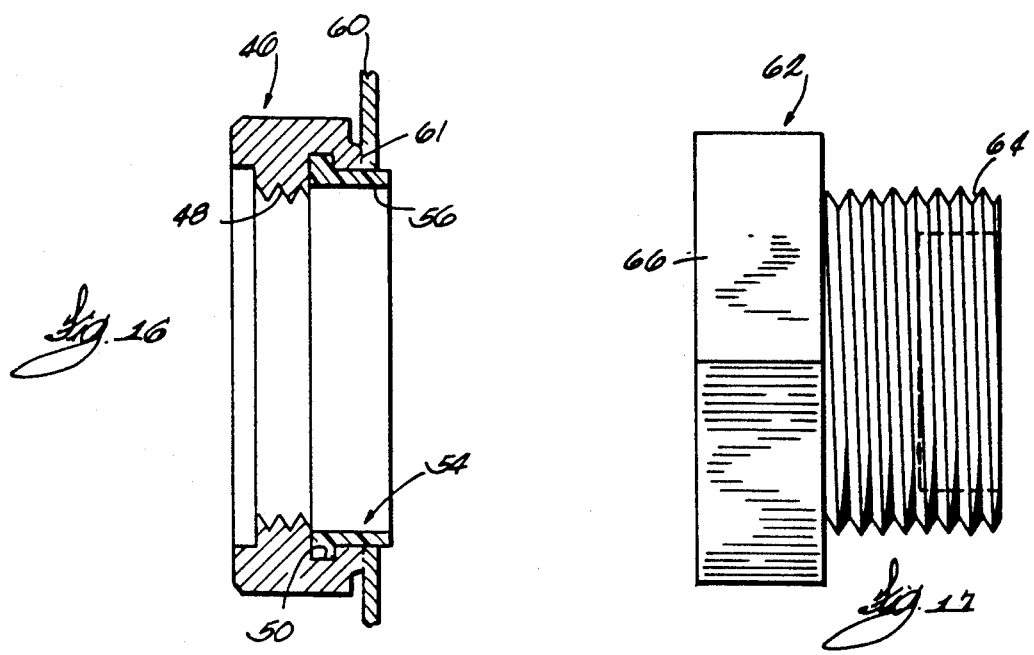
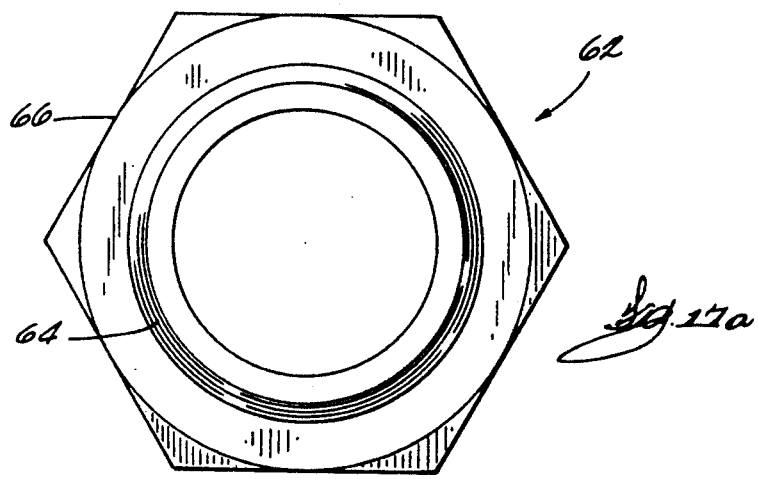
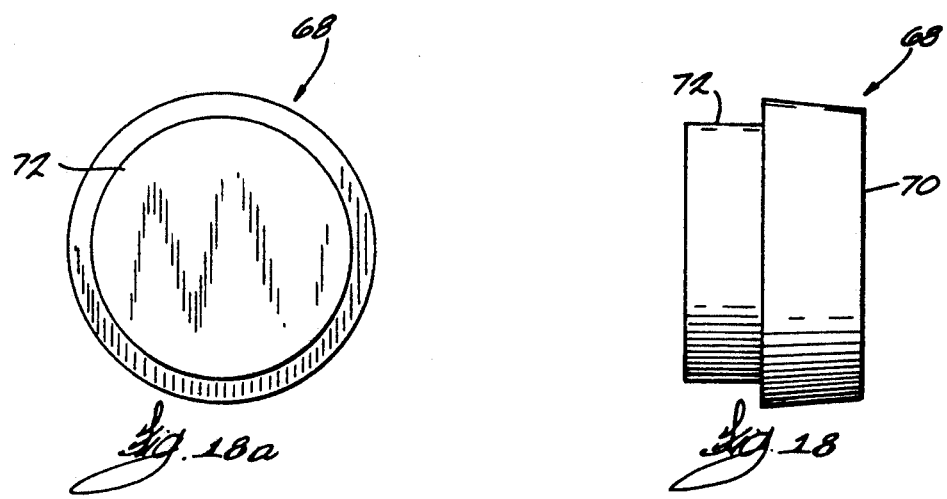

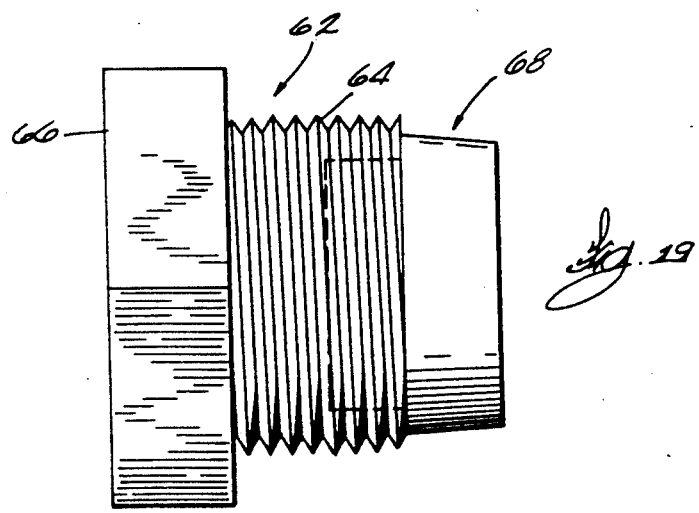
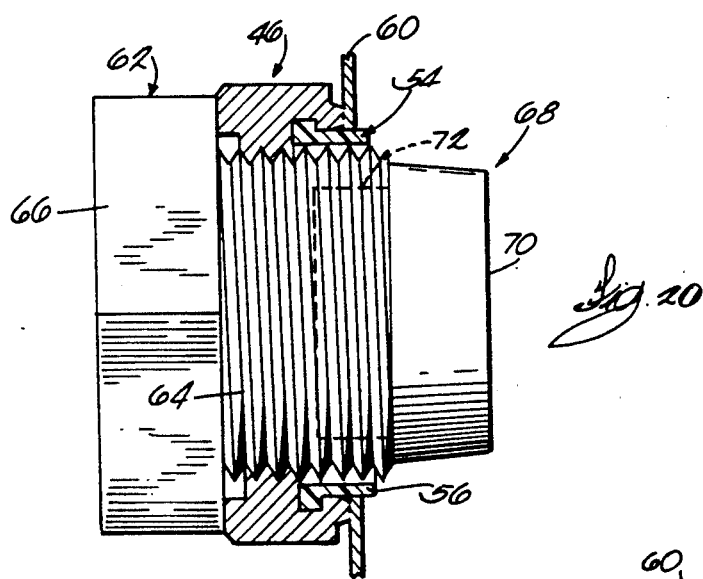
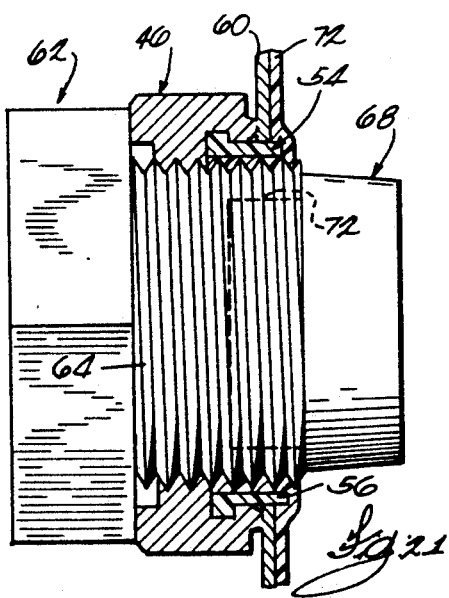
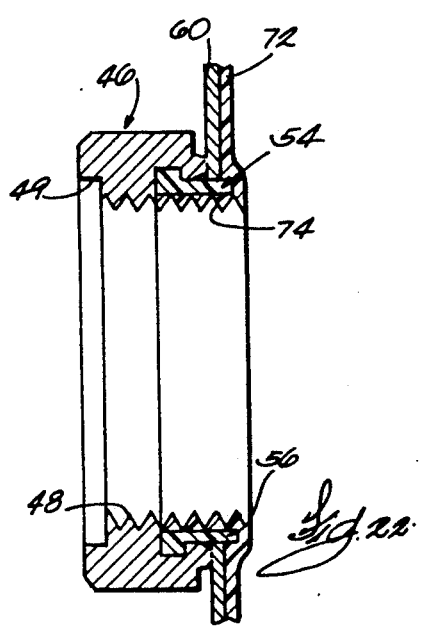

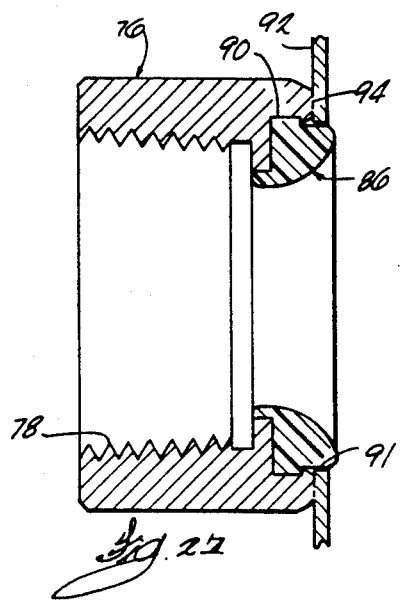
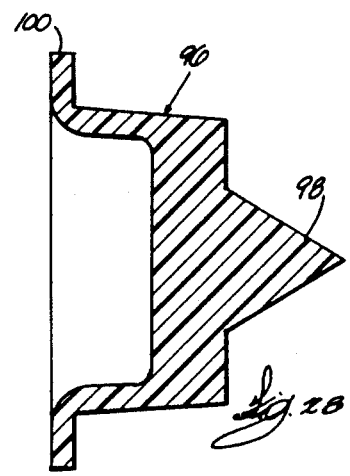
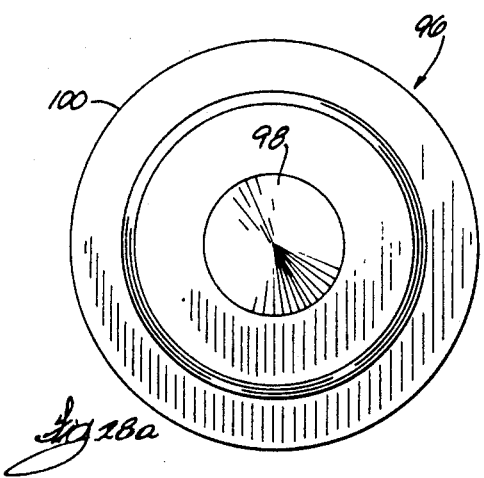
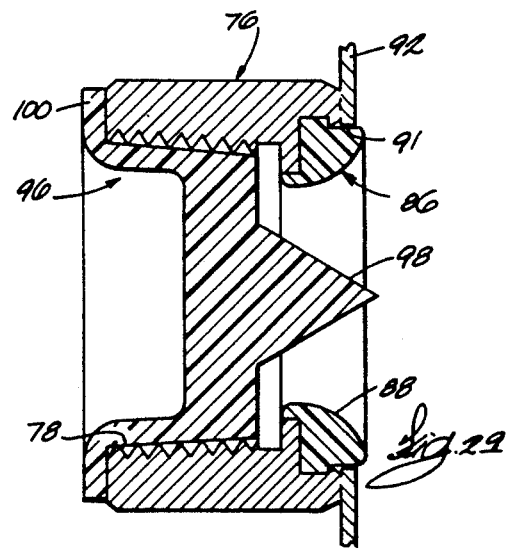
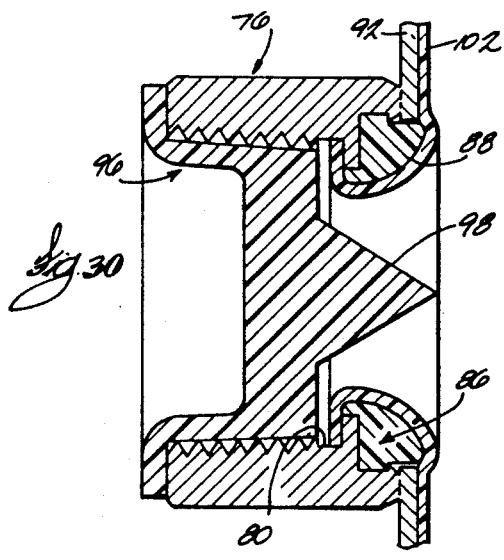
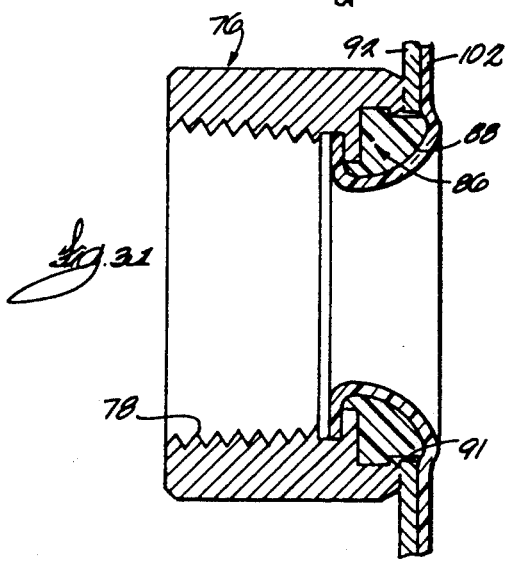

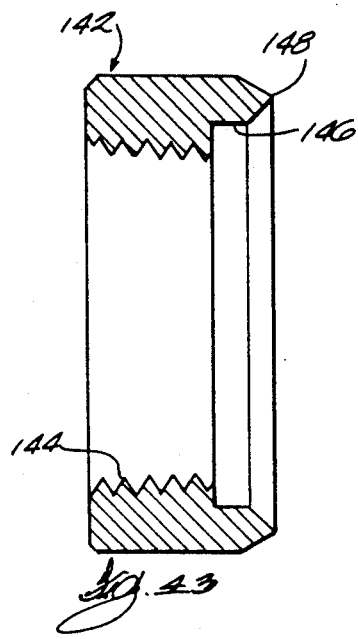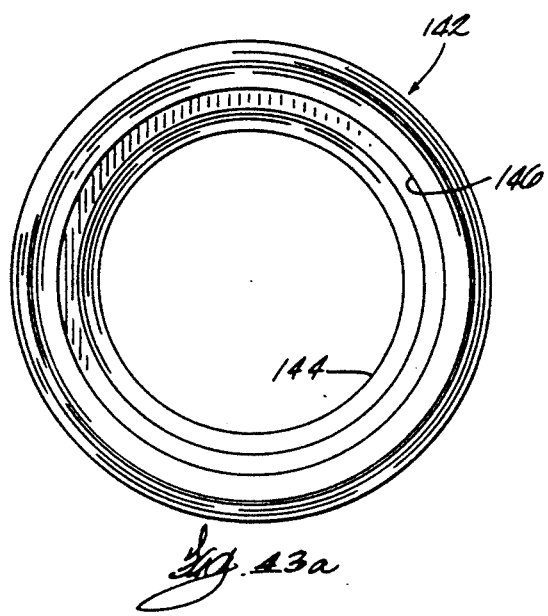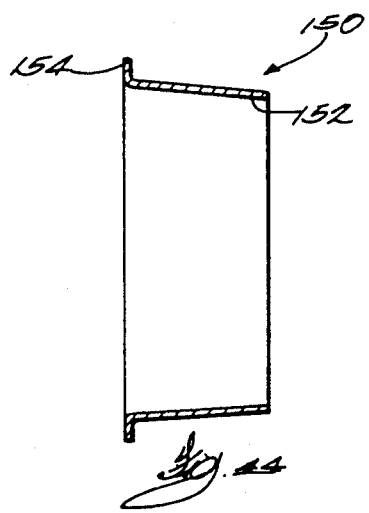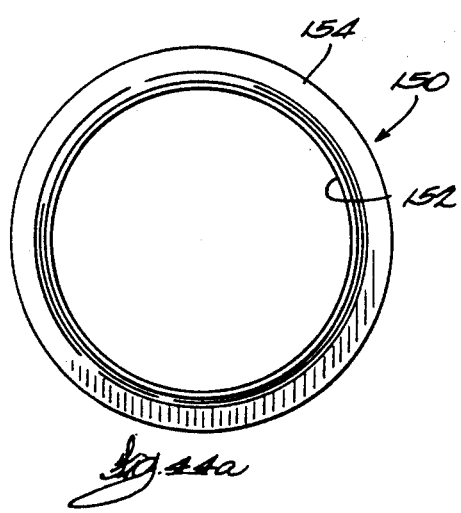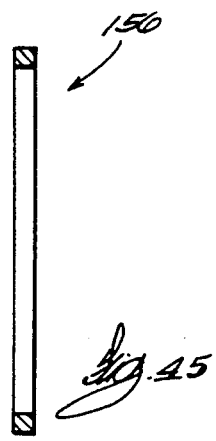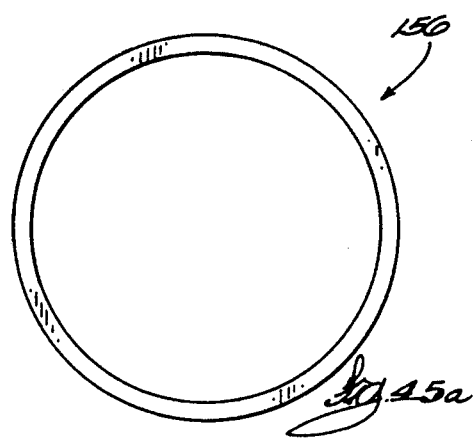

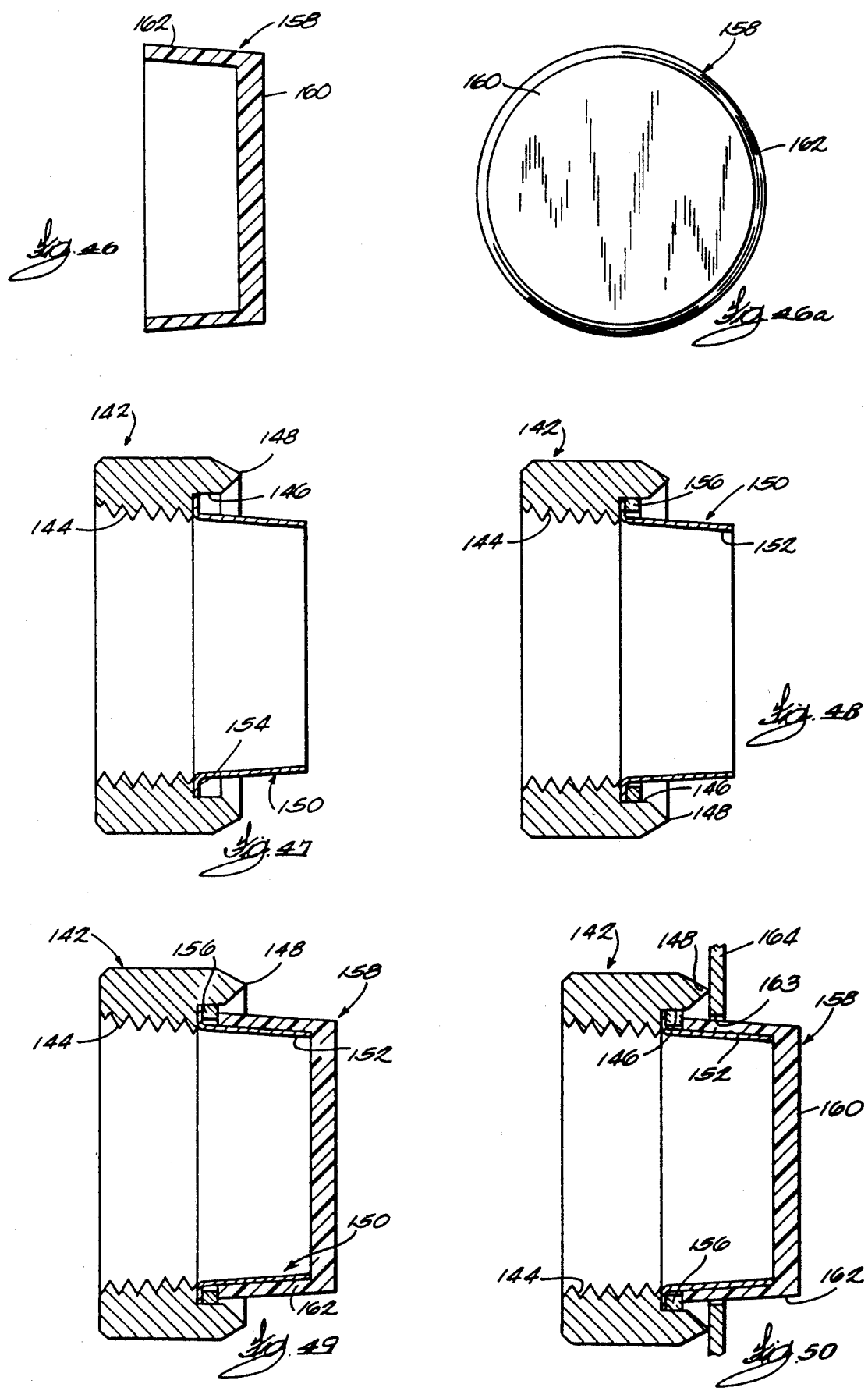

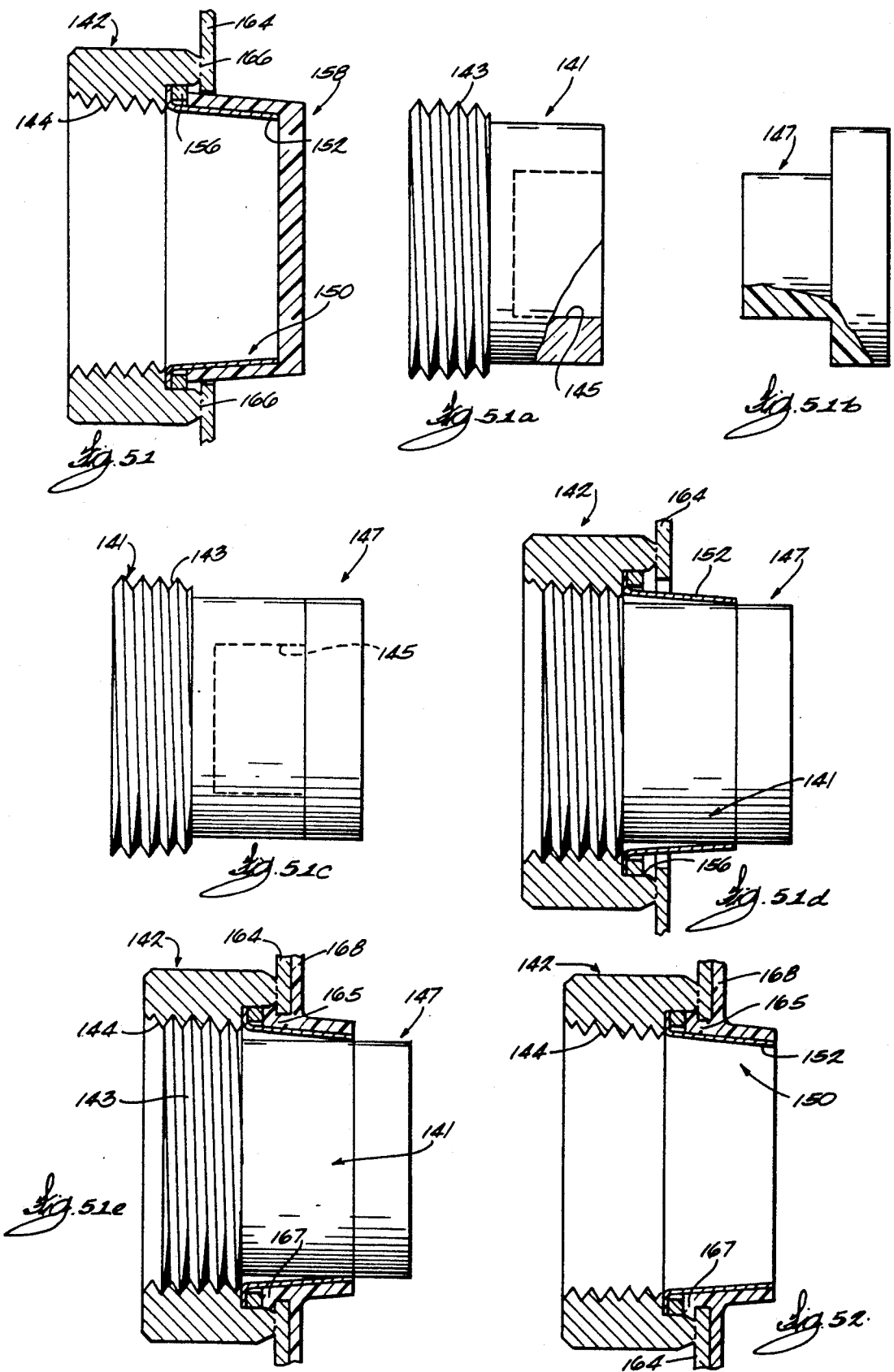

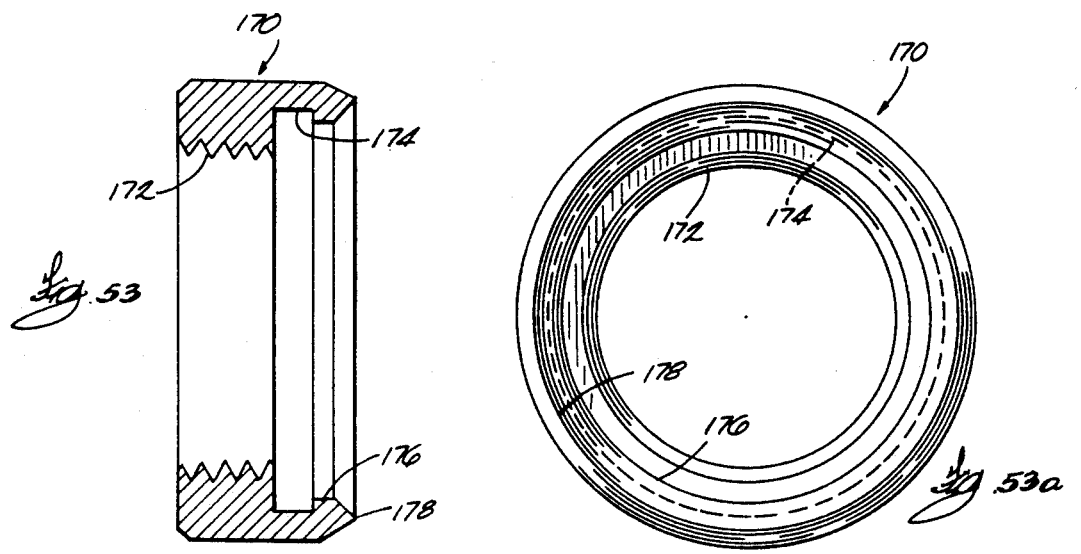
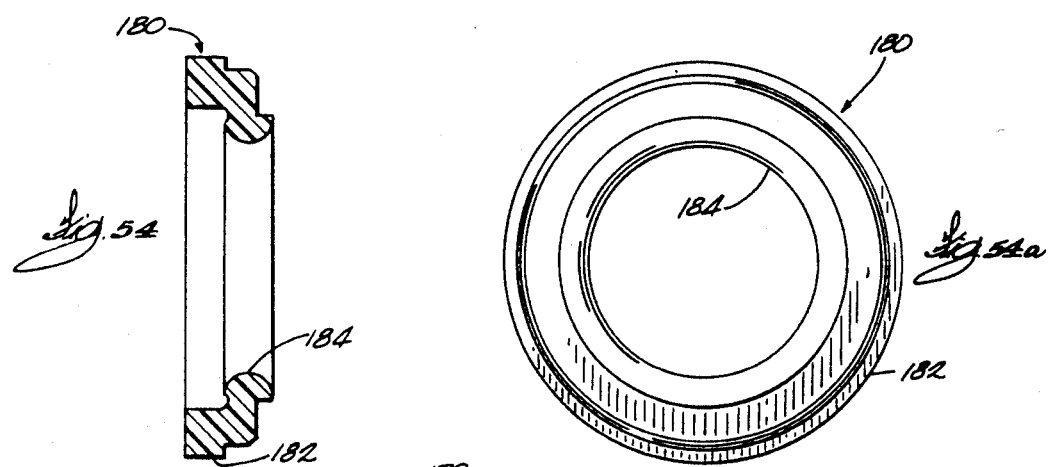
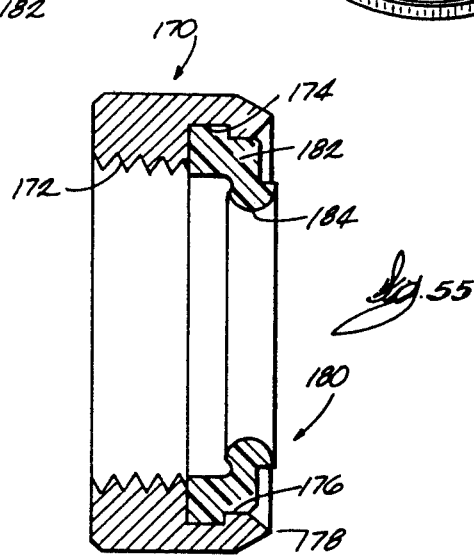

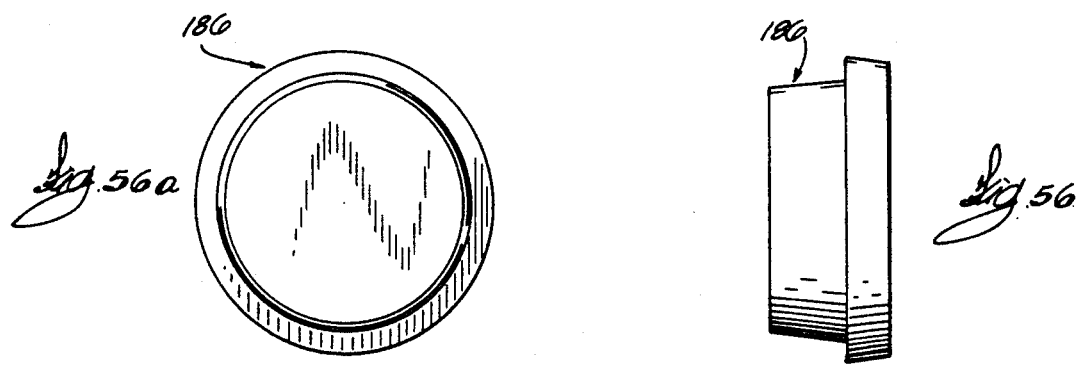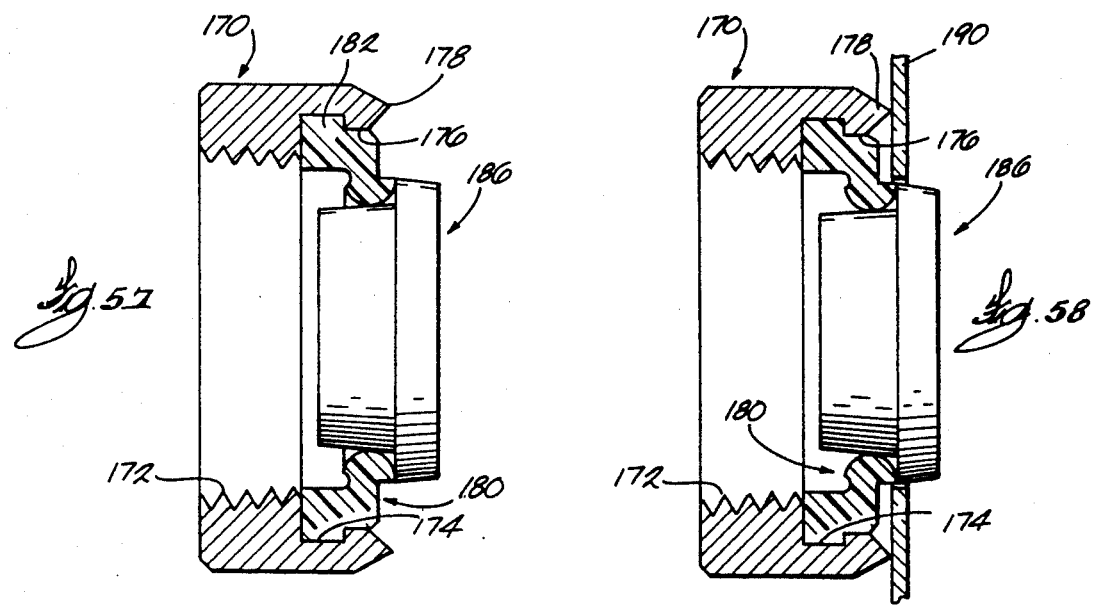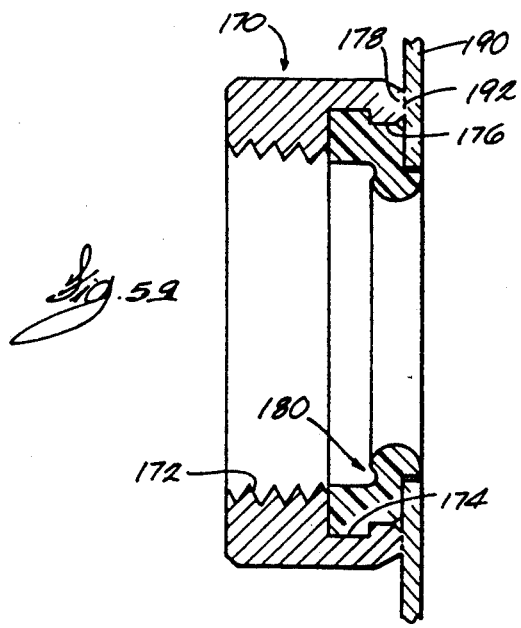

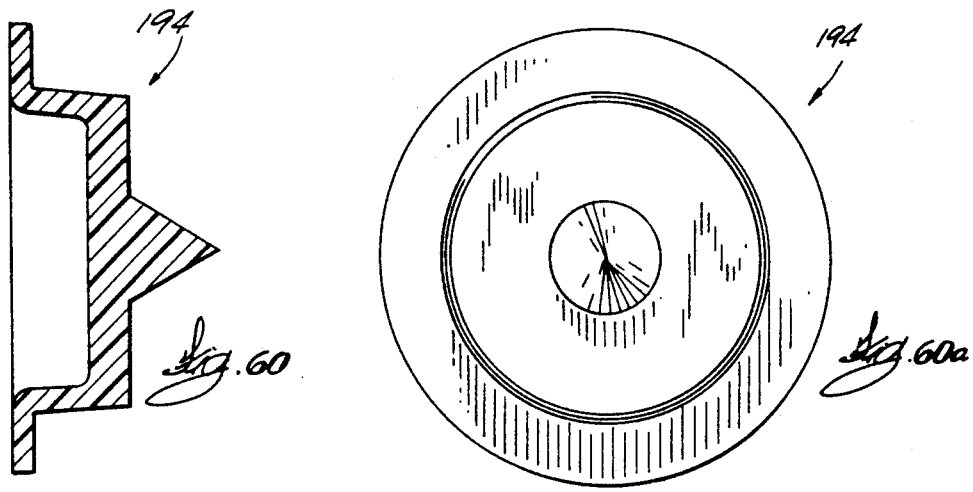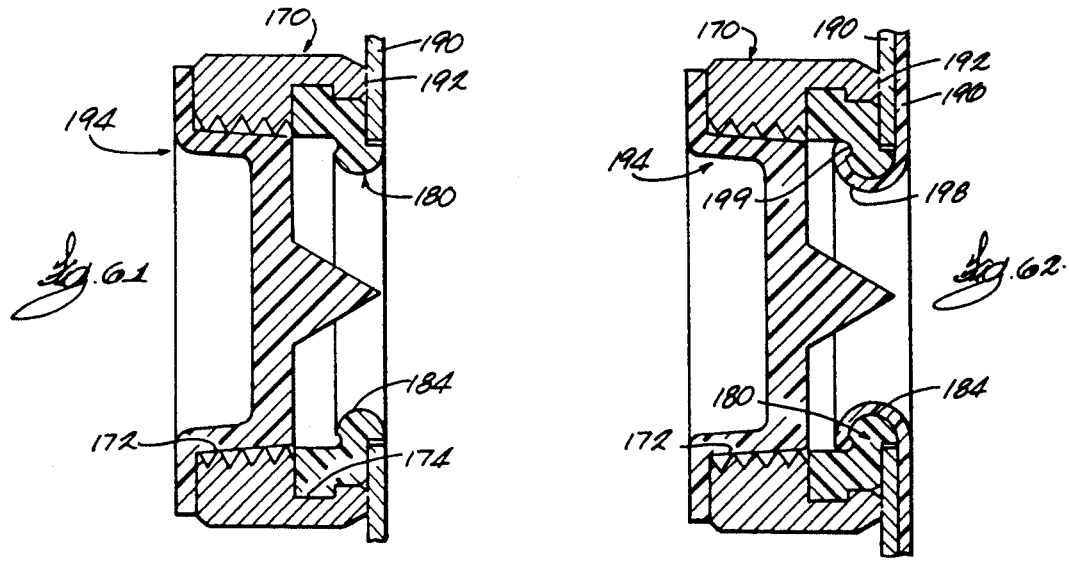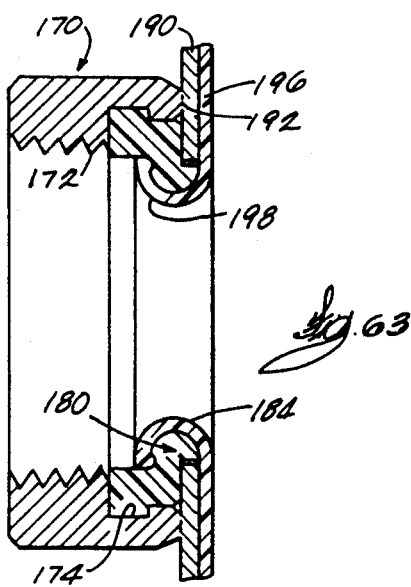

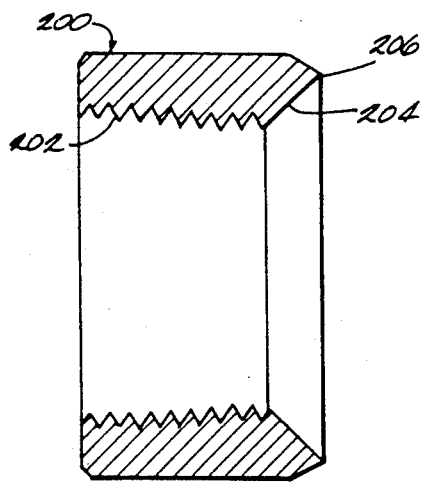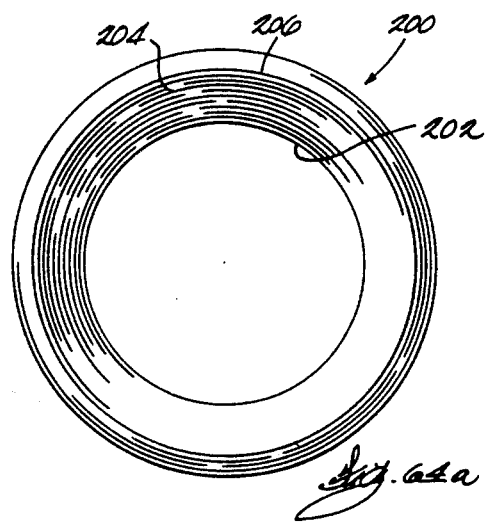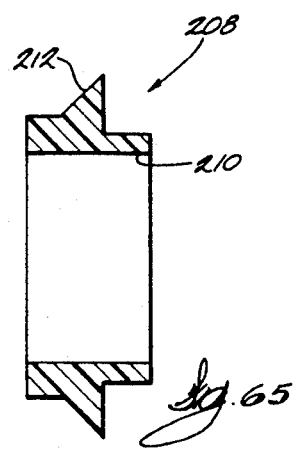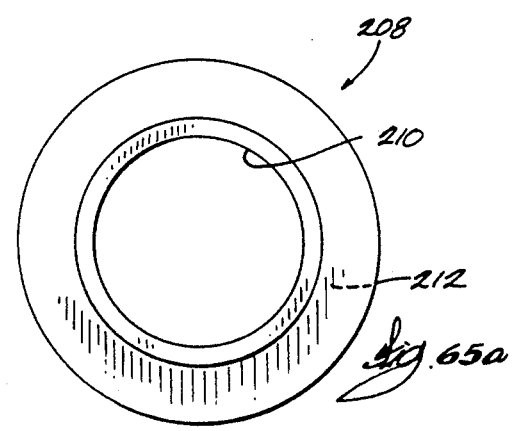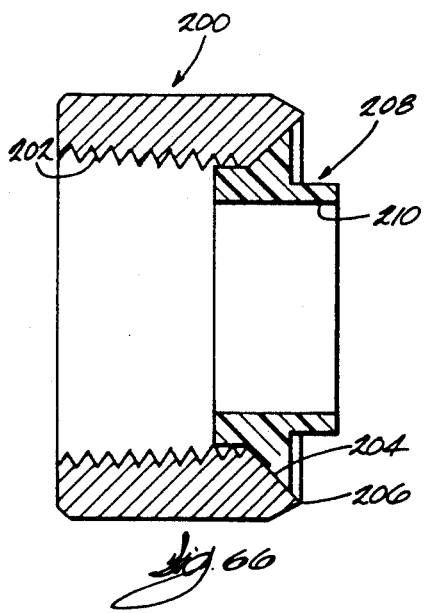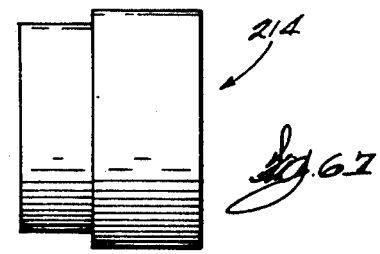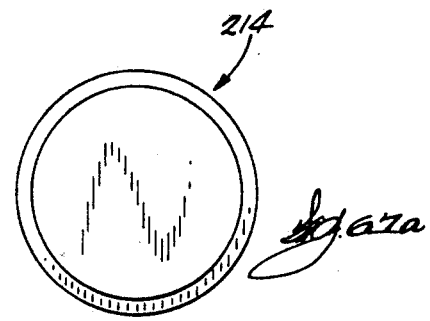

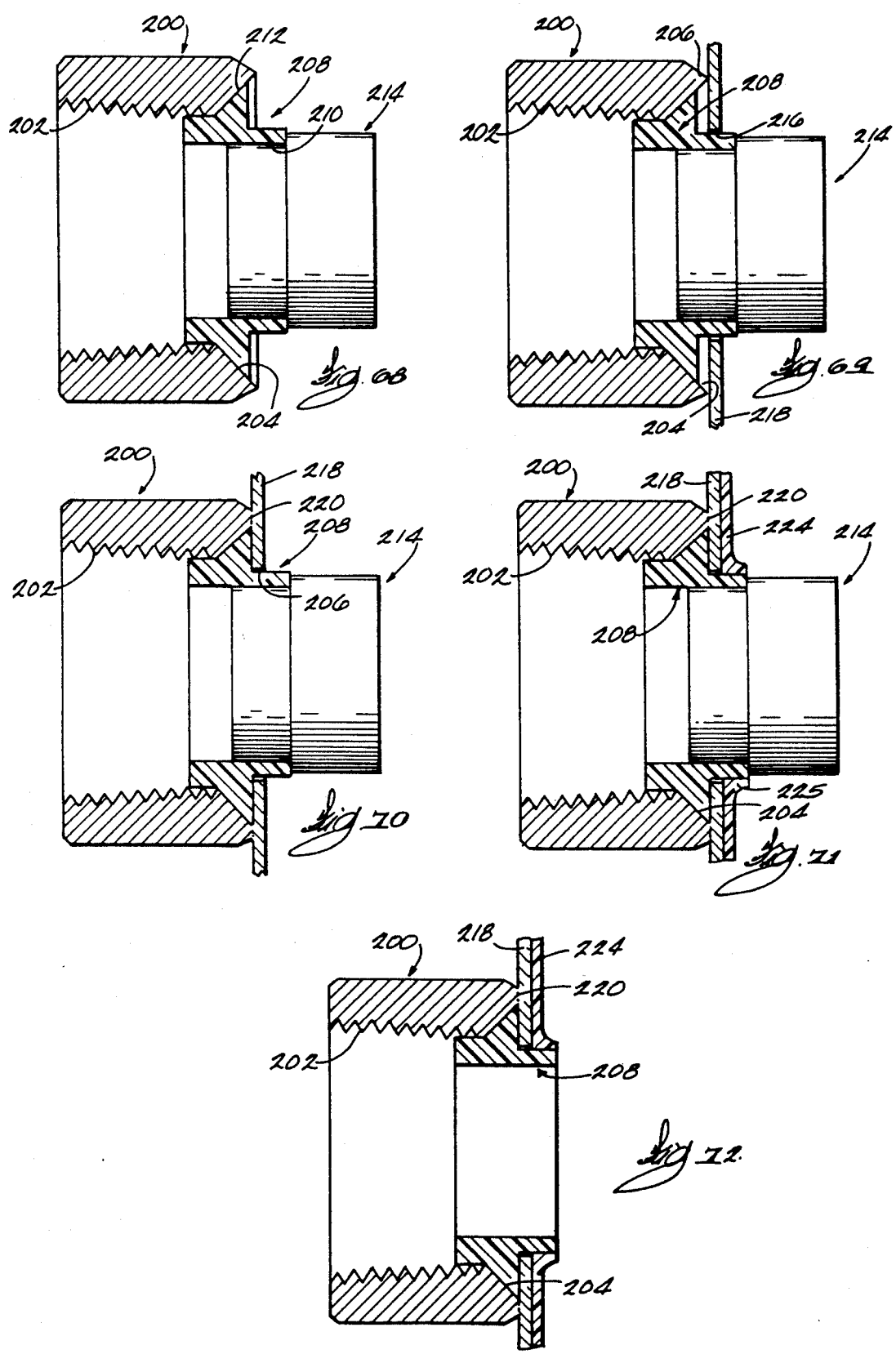

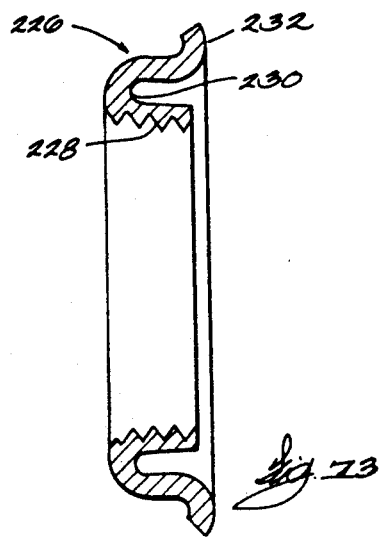 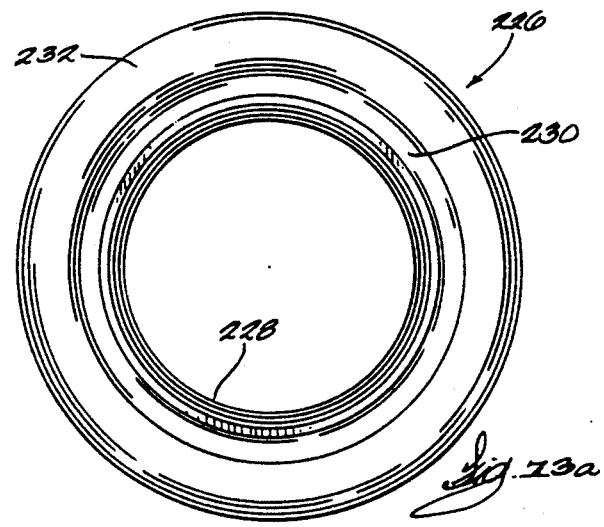
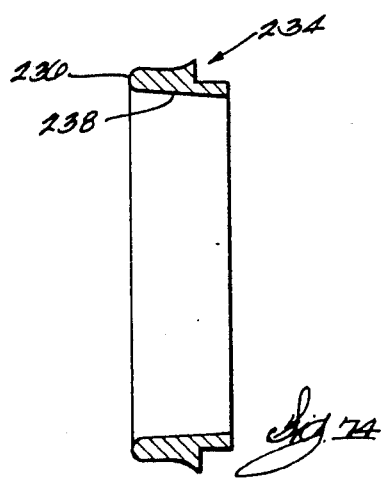 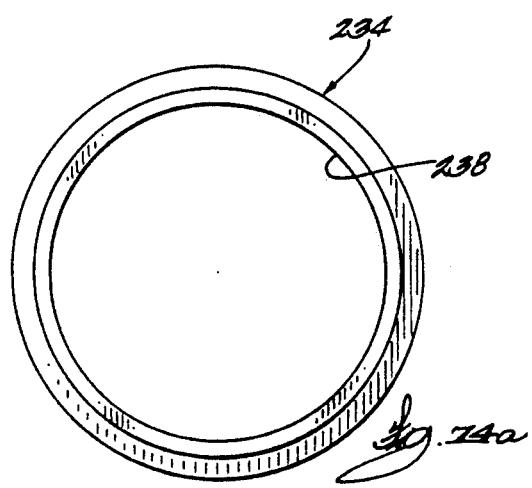
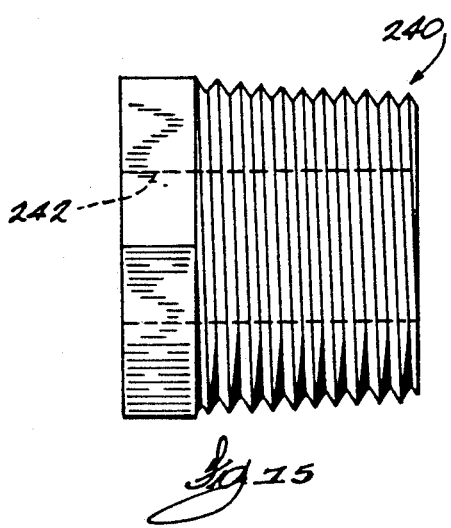 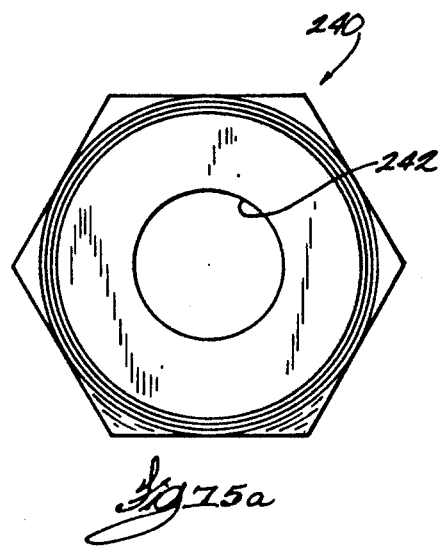

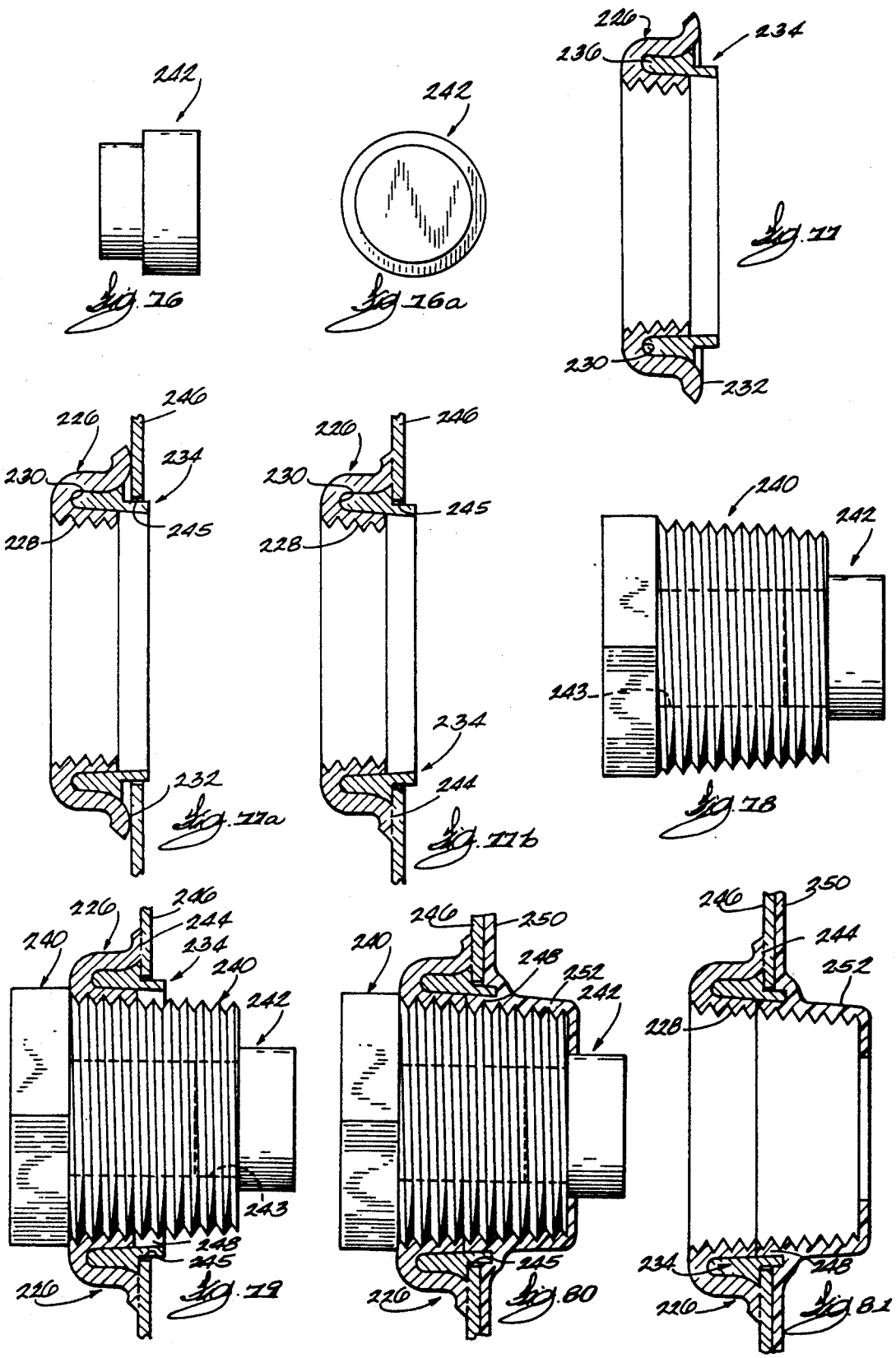

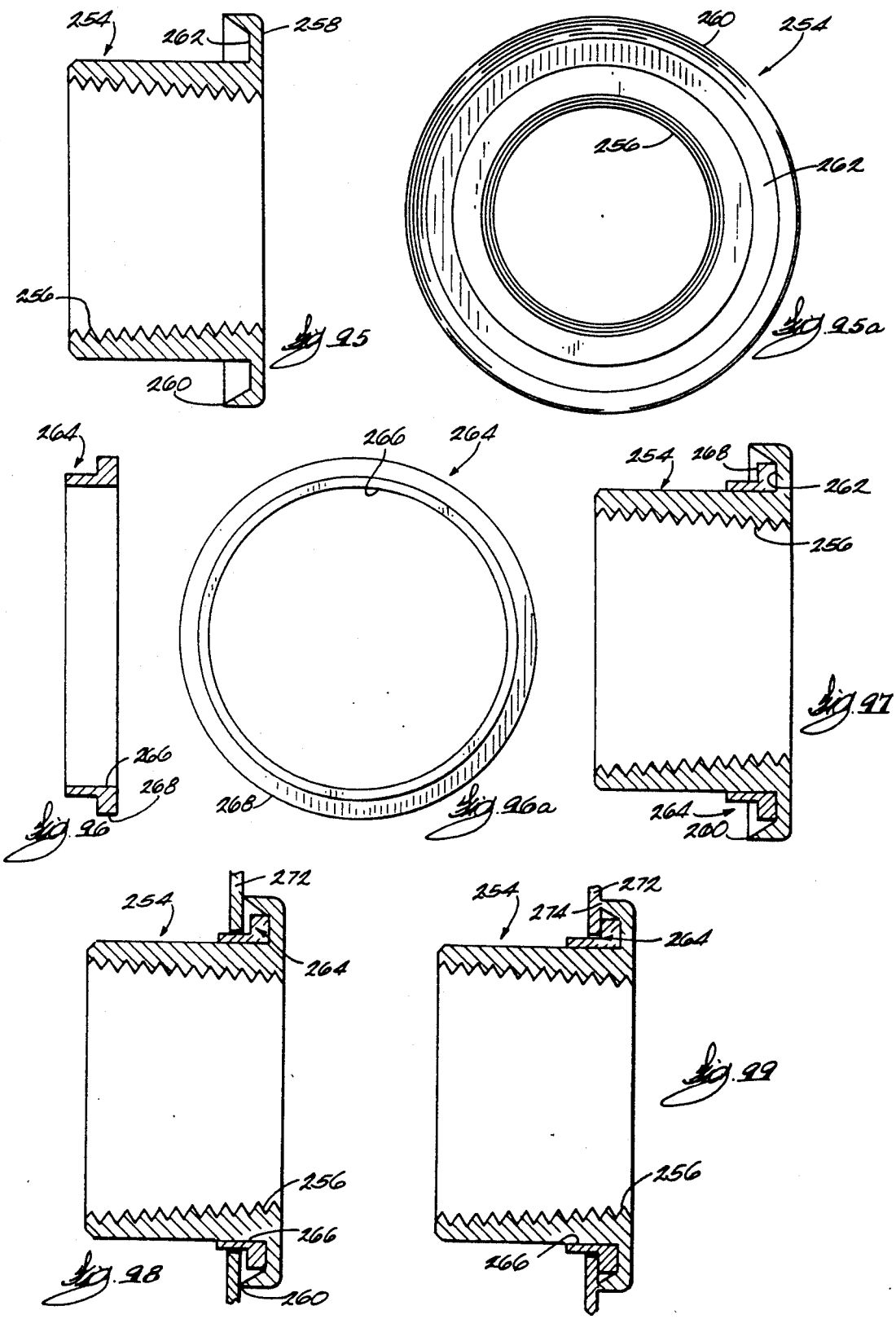

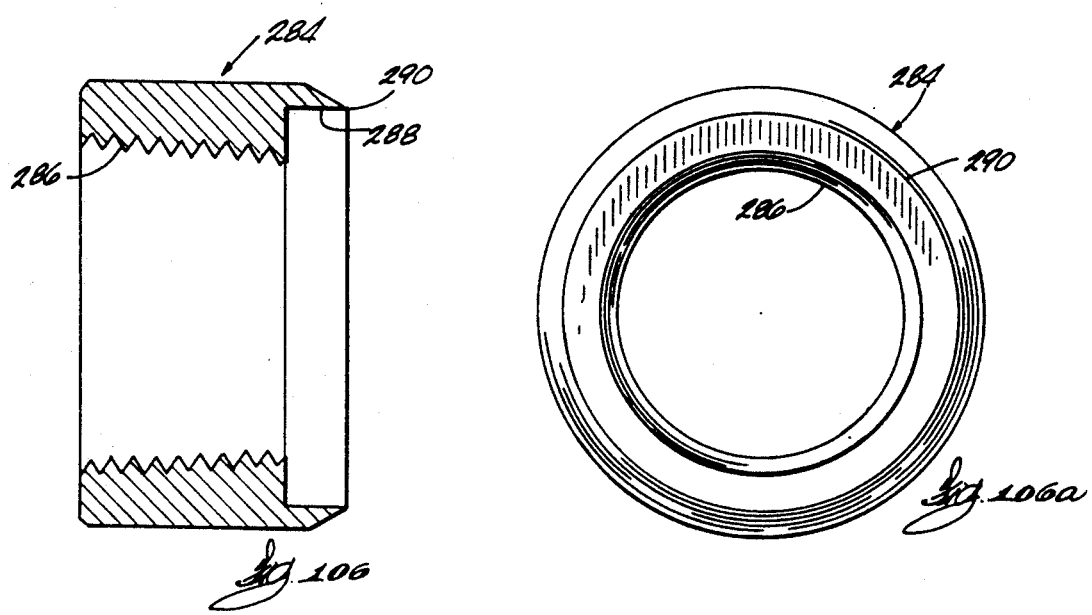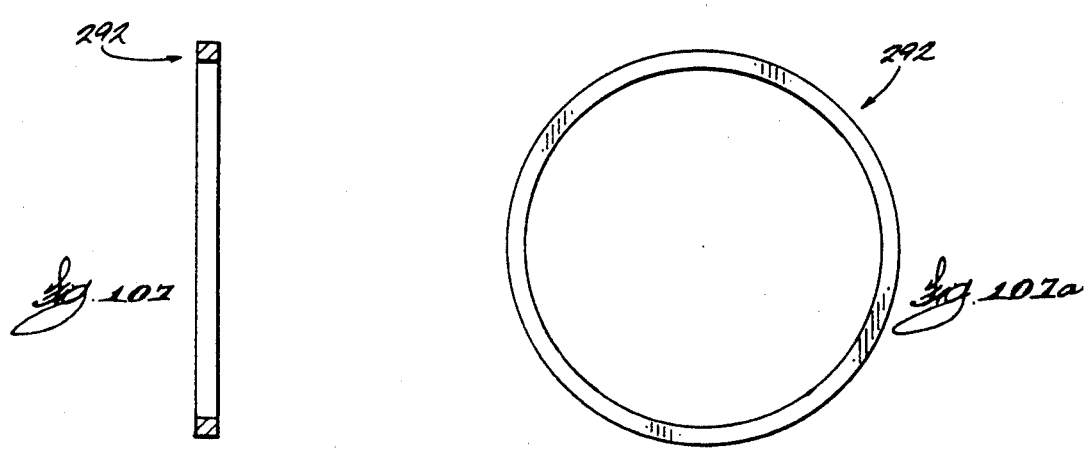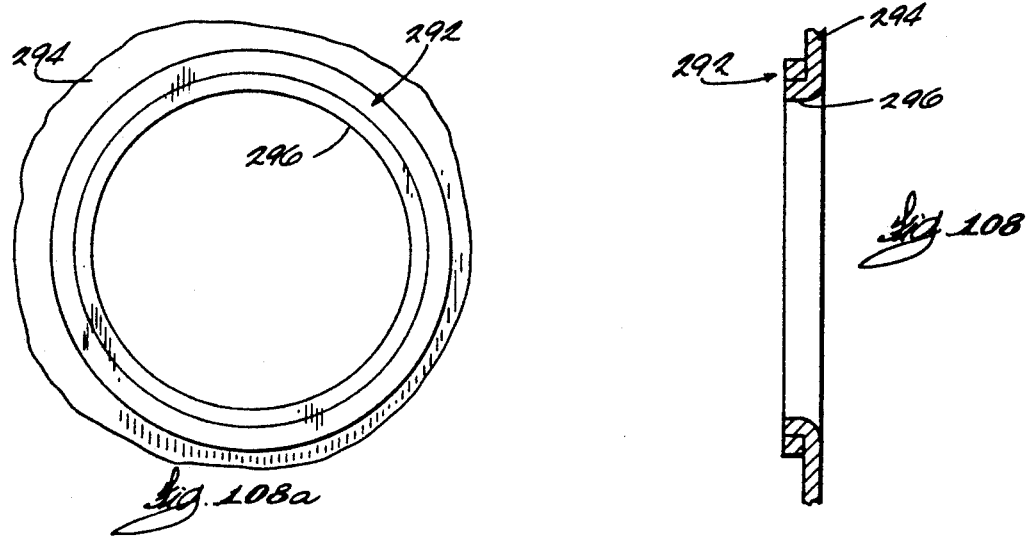

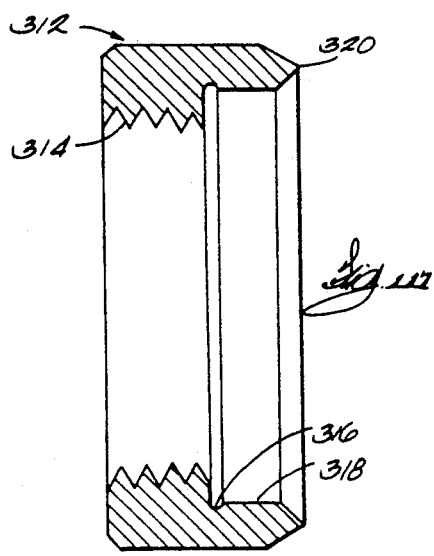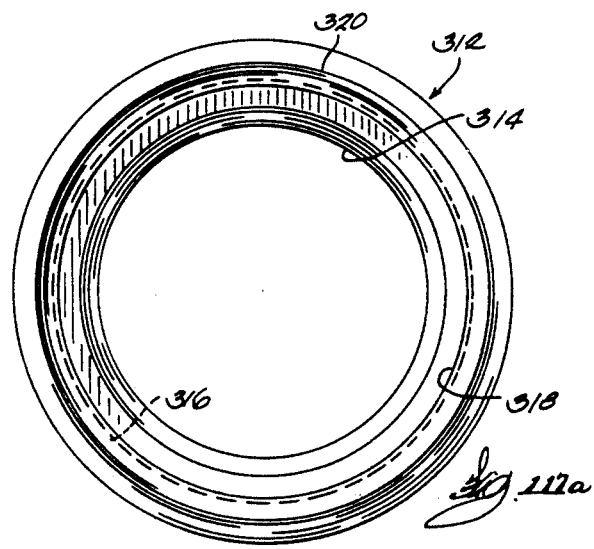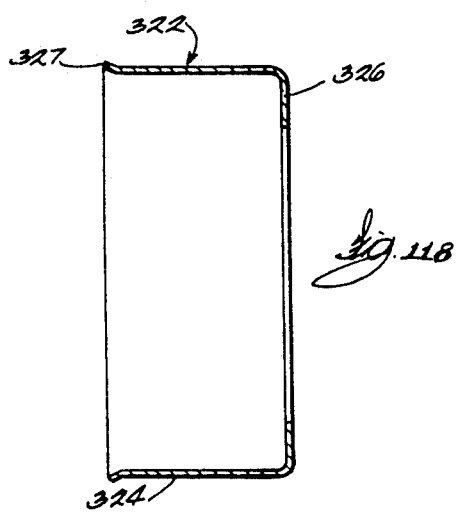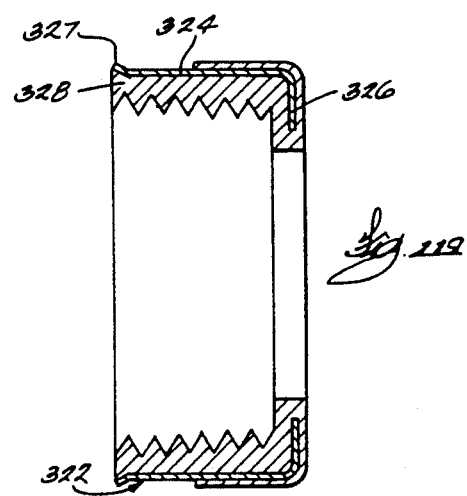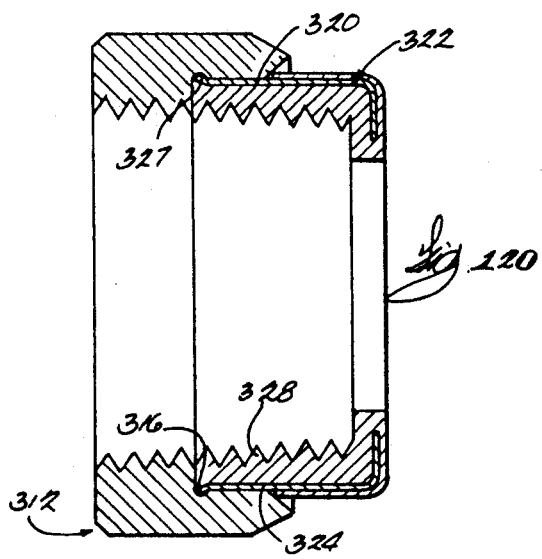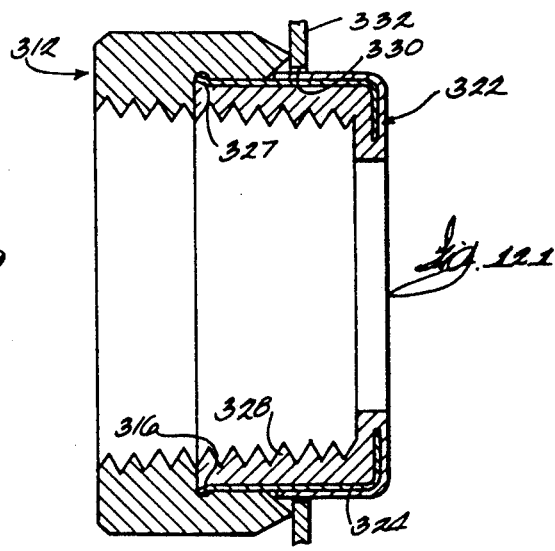

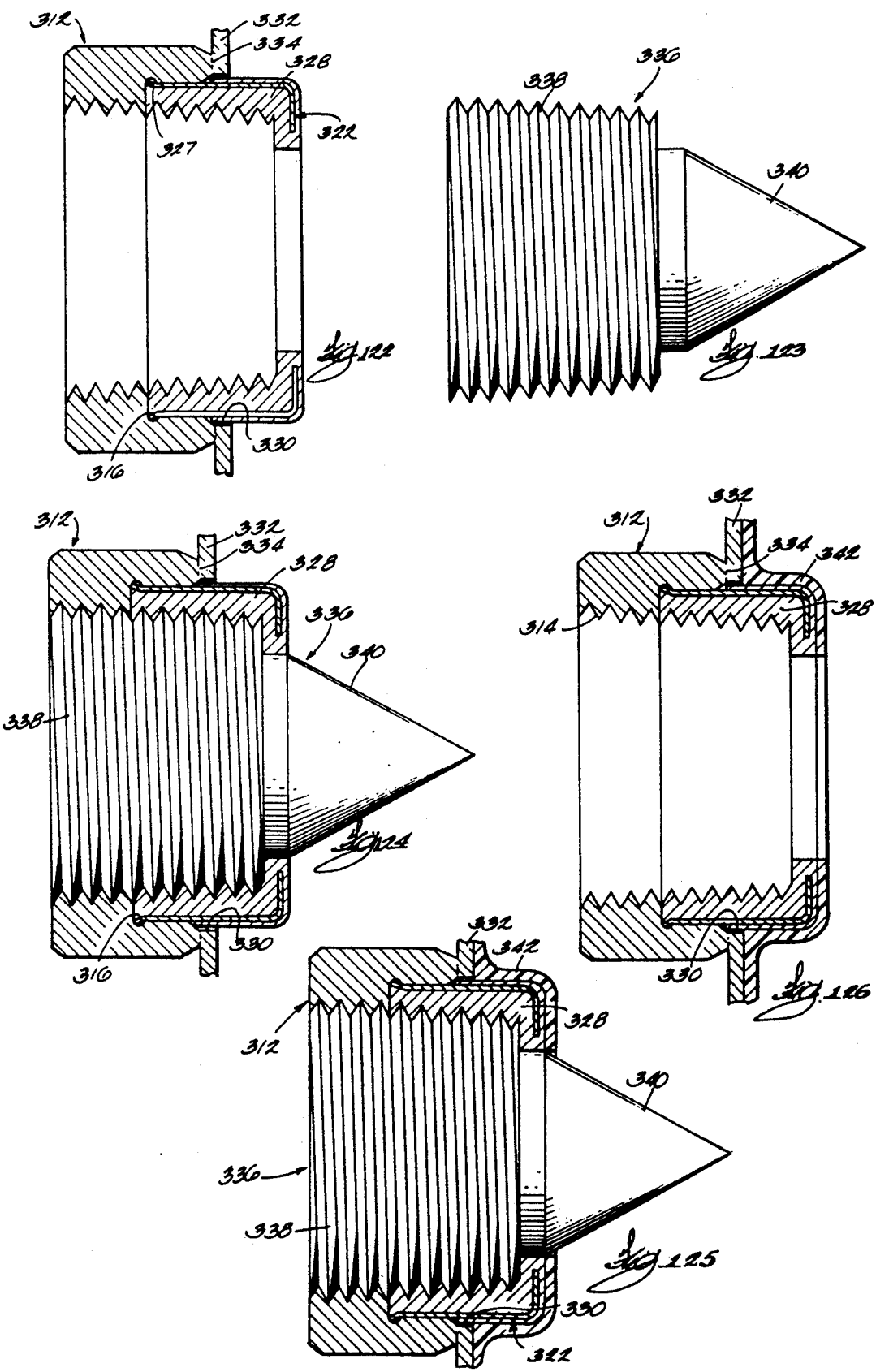

TANK CONNECTOR CONSTRUCTION AND METHOD OF FABRICATION

RELATED APPLICATIONS

This is a continuation-in-part of copending application Ser. No. 07/330,188 filed on Mar. 29, 1989 now abandoned.

BACKGROUND OF THE INVENTION

This invention relates to an improved tank connector construction and method of fabrication. More particularly this invention relates to a tank connector construction and method of fabrication designed for use in the tank construction described in U.S. application Ser. No. 179,670.

SUMMARY OF THE INVENTION

A tank connector construction for connecting the interior of a tank to the exterior of the tank. The tank is comprised of an outer shell of metal material and an inner shell of non-corrosive and non-metallic polymer material. A metal connector fitting having an internal threaded body, an internal groove and a weld projection portion is welded to the outer shell of the tank. A sleeve member of non-corrosive and non-metallic polymer material is seated in the internal groove in said connector fitting. An extension portion of the sleeve material is fused and formed integrally with the inner shell material to prevent contact between the contents of the inner shell and the outer shell of the tank.

DESCRIPTION OF THE DRAWINGS

FIG. 1 is a sectional view of a threaded connector fitting made in accordance with one embodiment of the present invention;

FIG. 1a is a plan view of the fitting shown in FIG. 1;

FIG. 2 is a sectional view of a sleeve member made in accordance with one embodiment of the present invention;

FIG. 2a is a plan view of the sleeve member shown in FIG. 2;

FIG. 3 is a sectional view of an assembly of the parts shown in FIGS. 1 and 2;

FIG. 4 is a sectional view of the assembly of FIG. 3 positioned for welding to an outer shell of tank at an opening in the wall;

FIG. 5 is a sectional view of the FIG. 4 assembly after it has been welded to the outer shell tank wall;

FIG. 6 is a side elevation view of a plug made from material having high thermal conductivity used in the present invention;

FIG. 6a is a plan view of the plug shown in FIG. 6;

FIG. 7 is a side elevation view of a cap made from material having low thermal conductivity value, and no bonding characteristics to polymer material used for the inner tank in the present invention;

FIG. 7a is a plan view of the heat plug cap shown in FIG. 7;

FIG. 8 is a side elevation view of an assembly of the parts shown in FIGS. 6 and 7;

FIG. 12 is a sectional view of a threaded connector fitting made in accordance with a second embodiment of the present invention;

FIG. 12a is a plan view of the fitting shown in FIG. 12;

FIG. 13 is a sectional view of a sleeve member made in accordance with a second embodiment of the present invention;

FIG. 13a is a plan view of the sleeve member shown in FIG. 13;

FIG. 14 is a sectional view of an assembly of the parts shown in FIGS. 12 and 13;

FIG. 15 is a sectional view of the assembly of FIG. 14 positioned for welding to outer shell of the tank at an opening in the wall;

FIG. 16 is a sectional view of the FIG. 15 assembly after it has been welded to the outer shell of the tank wall;

FIG. 17 is a side elevation view of the plug used in the present invention;

FIG. 17a is a plan view of the plug shown in FIG. 17;

FIG. 18 is a side elevation view of the cap used in the present invention;

FIG. 18a is a plan view of the cap shown in FIG. 18;

FIG. 19 is a side elevation view showing the assembly of the parts shown in FIGS. 17 and 18;

FIG. 20 is a sectional view of the assembly shown in FIG. 16 with the plug and cap assembly shown in FIG. 19 installed therein;

FIG. 21 is a sectional view of the connector assembly shown in FIG. 20 after an inner shell has been cast in place inside of the outer shell of the tank;

FIG. 22 is a sectional view of the completed tank connector construction after the plug and cap assembly of FIG. 19 has been removed;

FIG. 27 is a sectional view of the FIG. 26 assembly after it has been welded to the outer shell of the tank wall;

FIG. 28 is a sectional view of a cap member used in the present invention;

FIG. 28a is a plan view of the cap member shown in FIG. 28;

FIG. 29 is a sectional view of the assembly shown in FIG. 27 with the cap member of FIG. 28 installed therein;

FIG. 30 is a sectional view of the assembly shown in FIG. 29 after an inner shell has been cast in place inside of the outer shell of the tank;

FIG. 31 is a sectional view of the completed tank connector construction after the cap member of FIG. 28 has been removed;

FIG. 43 is a sectional view of a threaded connector fitting made in accordance with a fifth embodiment of the present invention;

FIG. 43a is a plan view of the fitting shown in FIG. 43;

FIG. 44 is a sectional view of a tube member made from material having high thermal conductivity material in accordance with a fifth embodiment of the present invention;

FIG. 44a is a plan view of the tube member shown in FIG. 44;

FIG. 45 is a sectional view of a retaining ring for use in a fifth embodiment of the present invention;

FIG. 45a is a plan view of the retaining ring shown in FIG. 45;

FIG. 46 is a sectional view of a cup member shown in FIG. 46;

FIG. 46a is a plan view of the locating cup member shown in FIG. 46;

FIG. 47 is a sectional view of an assembly of the connector fitting shown in FIG. 43 with the tube member shown in FIG. 44;

FIG. 48 is a sectional view of the assembly shown in FIG. 47 with the retaining ring of FIG. 45 installed into the assembly;

FIG. 49 is a sectional view of the assembly shown in FIG. 48 with the cup member of FIG. 46 installed in the assembly;

FIG. 50 is a sectional view of the FIG. 49 assembly positioned for welding to outer shell of the tank at an opening in the wall;

FIG. 51 is a sectional view of the FIG. 50 assembly after it has been welded to the tank wall;

FIG. 51a is a side elevation view of the plug;

FIG. 51b is a side elevation of the cap;

FIG. 51c is a side elevation view of the assembly of the FIG. 51a plug and the FIG. 51b cap;

FIG. 51d is a side elevation view of the FIG. 51 assembly with the cup of FIG. 46 removed and with the assembly of FIG. 51c threaded therein;

FIG. 51e is a sectional view of the FIG. 51d assembly after an inner shell has been cast in place inside of the outer shell of the tank;

FIG. 52 is sectional view of the completed tank connector construction after the plug assembly cup of FIG. 51c has been removed;

FIG. 53 is a sectional view of a threaded connector fitting made in accordance with a sixth embodiment of the present invention;

FIG. 53a is a plan view of the fitting shown in FIG. 53;

FIG. 54 is a sectional view of a sleeve member made in accordance with a sixth embodiment of the present invention;

FIG. 54a is a plan view of the sleeve member shown in FIG. 54;

FIG. 55 is a sectional view showing the assembly of the parts shown in FIGS. 53 and 54;

FIG. 56 is a side elevation view of a locator used in the present invention;

FIG. 56a is a plan view of the locator shown in FIG. 56;

FIG. 57 is sectional view of the assembly shown in FIG. 55 with the locating plug of FIG. 56 installed therein;

FIG. 58 is a sectional view of the assembly shown in FIG. 57 positioned for welding to the outer shell of the tank wall at an opening in the wall;

FIG. 59 is a sectional view of the FIG. 58 assembly after it has been welded to the tank wall;

FIG. 60 is a sectional view of plug used in the present invention;

FIG. 60a is a plan view of the plug shown in FIG. 60;

FIG. 61 is a sectional view of the assembly shown in FIG. 59 with the plug of FIG. 60 installed therein;

FIG. 62 is a sectional view of the assembly shown in FIG. 61 after an inner shell has been cast in place inside of the outer shell of the tank;

FIG. 63 is a sectional view of the completed tank connector construction after the plug of FIG. 60 has been removed;

FIG. 64 is a sectional view of a threaded connector fitting made in accordance with a sixth embodiment with the present invention;

FIG. 64a is a plan view of the fitting shown in FIG. 64;

FIG. 65 is a sectional view of a sleeve member made in accordance with a sixth embodiment of the present invention;

FIG. 65a is a plan view of the sleeve member shown in FIG. 65;

FIG. 66 is a sectional view of the assembly of the parts shown in FIGS. 64 and 65;

FIG. 67 is a side elevation view of the cap for use in the present invention;

FIG. 67a is a plan view of the cap shown in FIG. 67;

FIG. 68 is an assembly of the cap of FIG. 67 and the assembly of FIG. 66;

FIG. 69 is a sectional view of the assembly shown in FIG. 68 positioned for welding to outer shell of the tank at an opening in the wall;

FIG. 70 is a sectional view of the FIG. 69 assembly after it has been welded to the outer shell of the tank wall;

FIG. 71 is a sectional view of the FIG. 70 assembly after an inner shell has been cast in place inside of the outer shell of the tank;

FIG. 72 is a sectional view of the completed tank connector construction after the cap of FIG. 67 has been removed;

FIG. 73 is a cross sectional view of a threaded connector fitting made in accordance with an eight embodiment of the present invention;

FIG. 73a is a plan view of the fitting shown in FIG. 73;

FIG. 74 is a sectional view of a sleeve member made in accordance with an eighth embodiment of the present invention;

FIG. 74a is a plan view of the sleeve member shown in FIG. 74;

FIG. 75 is a side elevation view of the plug for use in the present invention;

FIG. 75a is a plan view of the plug shown in FIG. 75;

FIG. 76 is a side elevation view of the cap for use in the present invention;

FIG. 76a is a plan view of the cap shown in FIG. 76;

FIG. 77 is a sectional view of an assembly of the parts shown in FIG. 73 and 74;

FIG. 77a is a sectional view of the FIG. 77 assembly positioned for welding to the outer shell of the tank wall at an opening in the wall;

FIG. 77b is a sectional view of the FIG. 77a assembly after it has been welded to the outer shell of the tank wall;

FIG. 78 is a side elevation view of the assembly of the parts shown in FIGS. 75 and 76;

FIG. 79 is a sectional view of an assembly of the plug assembly shown in FIG. 78 with the assembly shown in FIG. 77b;

FIG. 80 is a sectional view of the assembly shown in FIG. 79 after an inner shell has been cast in place inside of the outer shell of the tank;

FIG. 81 is a sectional view of the completed tank connector construction after the plug assembly of FIG. 78 has been removed;

FIG. 95 is a sectional view of a threaded connector fitting made in accordance with a ninth embodiment of the present invention;

FIG. 95a is a plan view of the fitting shown in FIG. 95;

FIG. 96 is a sectional view of a sleeve member made in accordance with a ninth embodiment of the present invention;

FIG. 96a is a plan view of the sleeve member shown in FIG. 96;

FIG. 97 is a sectional view of an assembly of the parts shown in FIGS. 95 and 96;

FIG. 98 is a sectional view of the assembly shown in FIG. 97 positioned for welding to the outer shell of the tank at an opening in the wall;

FIG. 99 is a sectional view of the assembly shown in FIG. 98 after it has been welded to the outer shell of the tank wall;

FIG. 100 is a side elevation view of the plug for use in the present invention;

FIG. 101 is a side elevation view of the cap for use in the present invention;

FIG. 101a is a plan view of the cap shown in FIG. 101;

FIG. 102 is a side elevation view of an assembly of the parts shown in FIGS. 100 and 101;

FIG. 103 is a sectional view of an assembly of the parts shown in FIGS. 99 and 102

FIG. 104 is a sectional view of the assembly shown in FIG. 103 after an inner shell has been cast in place inside of the outer shell of the tank;

FIG. 105 is a sectional view of the completed tank connector construction after the plug assembly of FIG. 102 has been removed;

Figure 109:
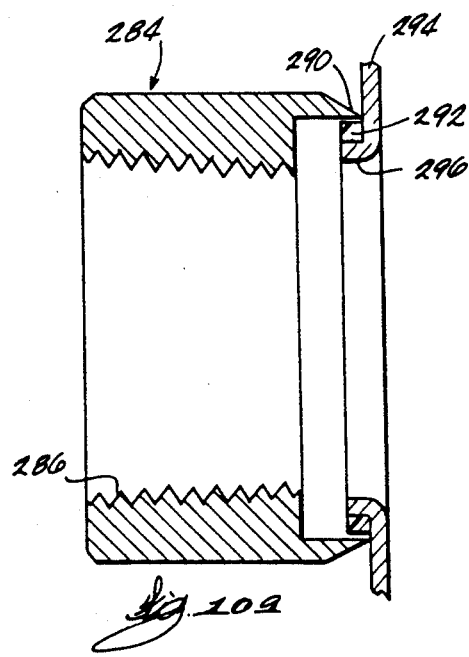
Figure 110:
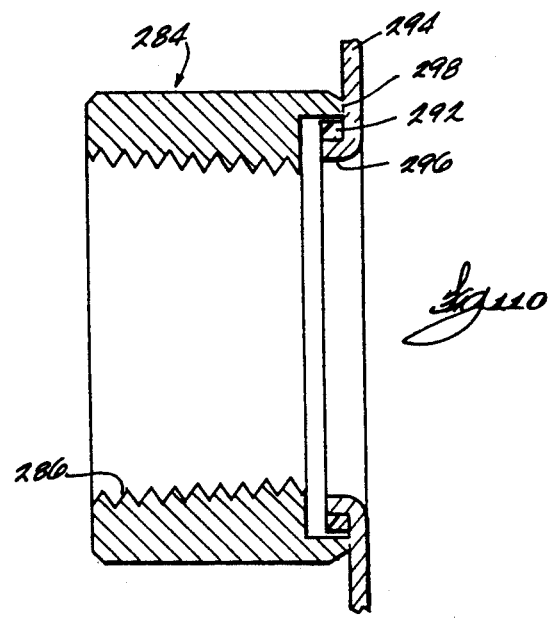
Figure 111:
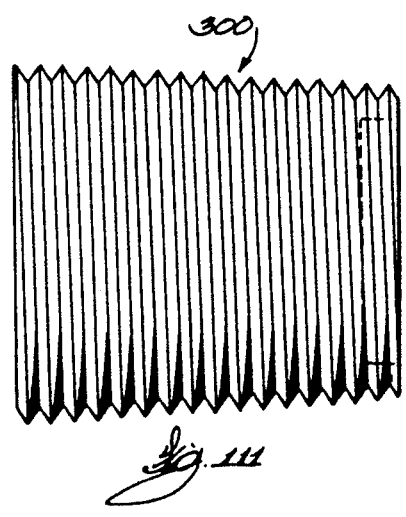
Figure 112A:
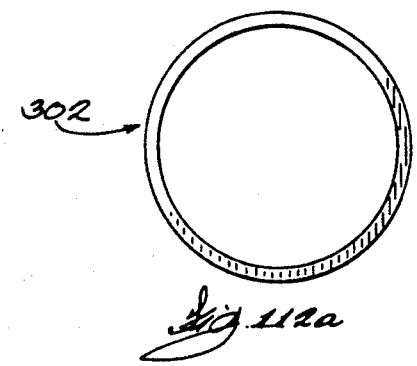
Figure 112:
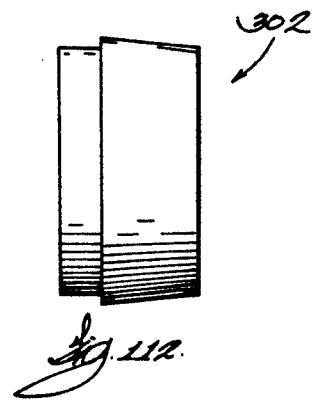
Figure 113:
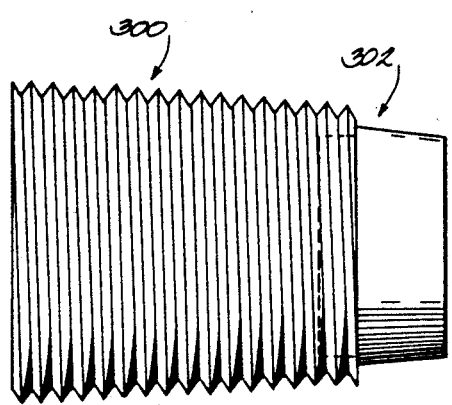
Figure 114:
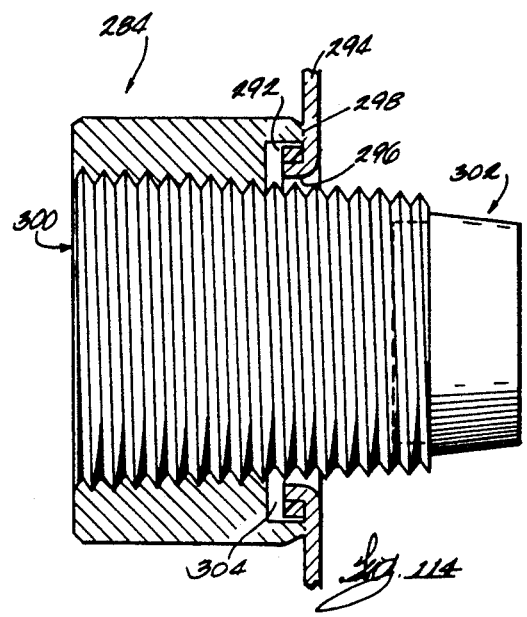
Figure 115:
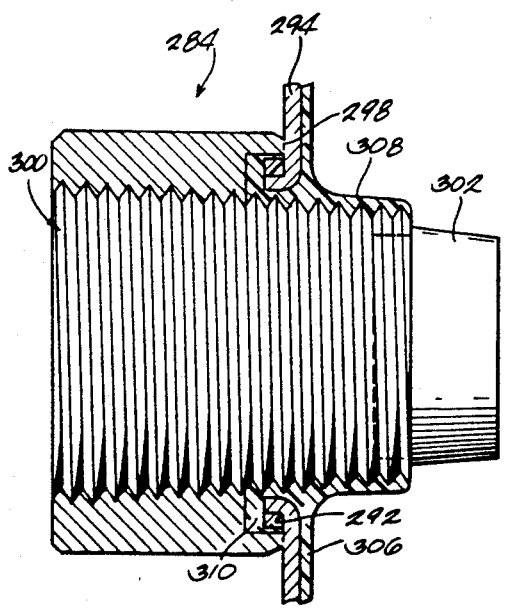
Figure 116:
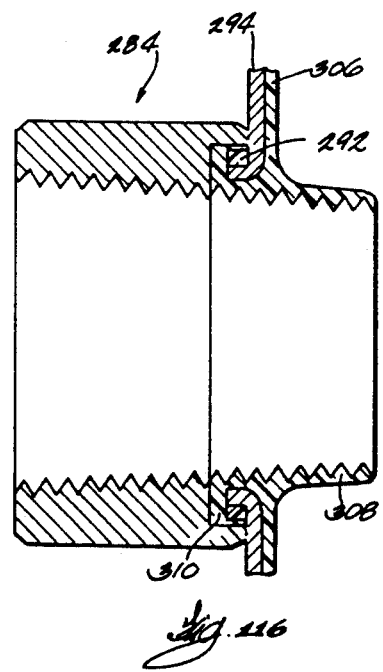
Figure 127:
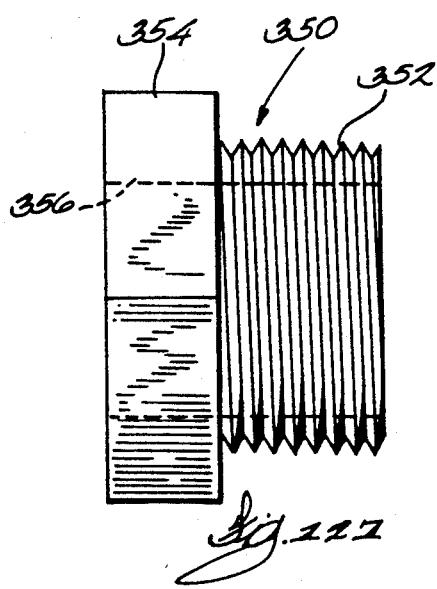
Figure 128:
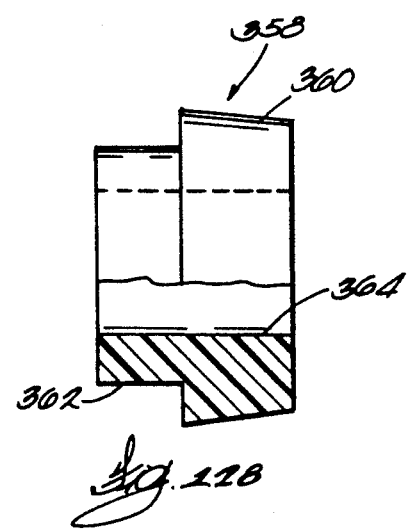
Figure 129:
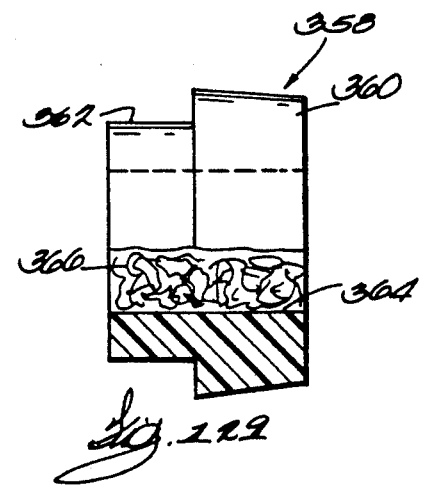
Figure 130:
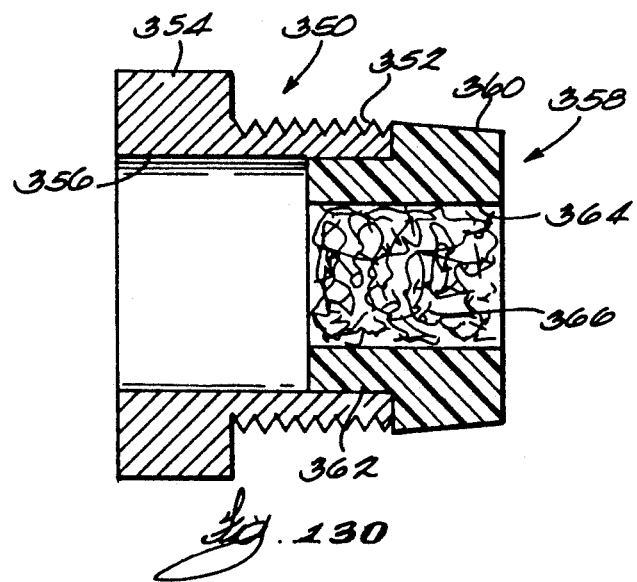

FIG. 106 is a sectional view of a threaded connector fitting made in accordance with a tenth embodiment of the present invention;

FIG. 106a is a plan view of the fitting shown in FIG. 106;

FIG. 107 is a sectional view of a sleeve member made in accordance with a tenth embodiment of the present invention;

FIG. 107a is a plan view of the sleeve member shown in FIG. 107;

FIG. 108 is a sectional view showing the assembly of the FIG. 107 sleeve at an opening in the outer shell of the tank;

FIG. 108a is a plan view of the assembly shown in FIG. 108;

FIG. 109 is a sectional view of the assembly of the parts shown in FIGS. 106 and 108 such parts being positioned for welding to the outer shell of the tank wall at an opening in the wall;

FIG. 110 is a sectional view of the assembly shown in FIG. 109 after it has been welded to the outer shell of the tank wall;

FIG. 111 is a side elevation view of the plug for use in the present invention;

FIG. 112 is a side elevation view of the cap for use in the present invention;

FIG. 112a is a plan view of the cap shown in FIG. 112;

FIG. 113 is a side elevation view of an assembly of the parts shown in FIGS. 111 and 112;

FIG. 114 is a sectional view of the assembly of the parts shown in FIGS. 110 and 113;

FIG. 115 is a sectional view of the FIG. 114 assembly after an inner shell has been cast in place inside of the outer shell of the tank;

FIG. 116 is a sectional view of the completed tank connector construction after the plug assembly of FIG. 113 has been removed;

FIG. 117 is a sectional view of a threaded connector fitting made in accordance with an eleventh embodiment of the present invention;

FIG. 117a is a plan view of a fitting shown in FIG. 117;

FIG. 118 is a sectional view of the cup member made in accordance with an eleventh embodiment of the present invention;

FIG. 119 is a sectional view showing an assembly of the parts shown in FIGS. 117 and 118 after the non-metallic and non-corrosive material applied thereto;

FIG. 120 is a sectional view of the FIG. 119 assembly positioned for welding to the outer shell of the tank at an opening in the wall;

FIG. 121 is a sectional view of the FIG. 120 assembly after it has been welded to the outer shell of the tank wall;

FIG. 122 is a side elevation view of the plug for use in the present invention;

FIG. 123 is a sectional view of an assembly of the parts shown in FIGS. 121 and 122;

FIG. 124 is a sectional view of the FIG. 123 assembly after an inner shell has been cast in place inside of the outer shell of the tank;

FIG. 125 is a sectional view of the completed tank connector construction after the cap of FIG. 122 has been removed;

FIG. 127 is a side view of a plug made from high thermal conductivity material;

FIG. 128 is a side elevation view of a cap adapted for assembly with the FIG. 127 plug;

FIG. 129 is a view of the FIG. 128 cap with a fiberglass plug installed therein; and FIG. 130 is a view of the assembly of the FIG. 127 plug with the FIG. 129 cap.

Figure 131:
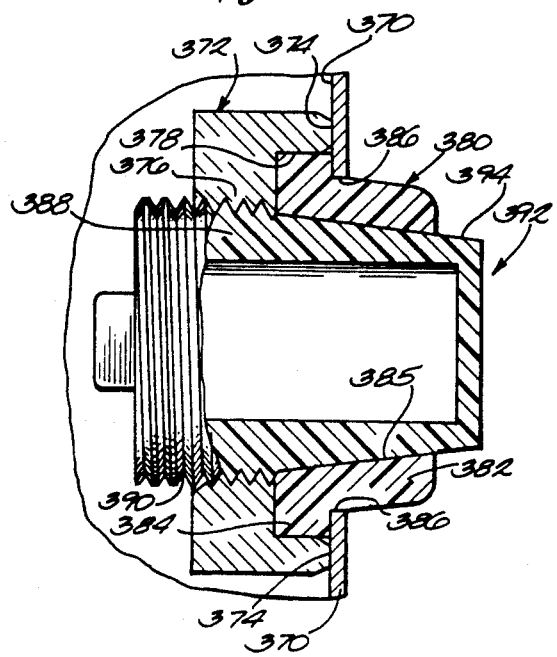
Figure 132:
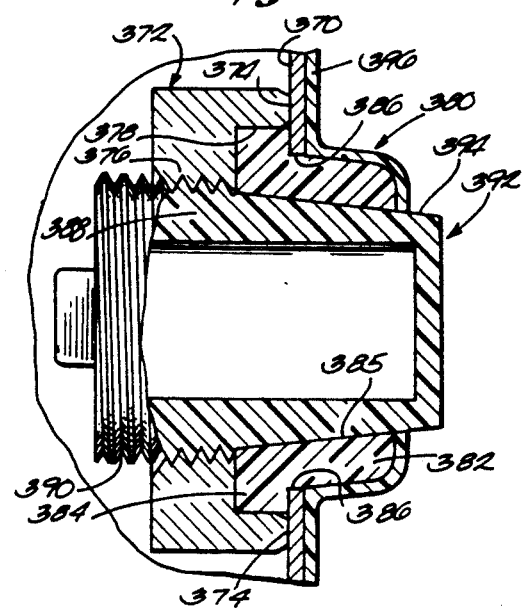
Figure 133:
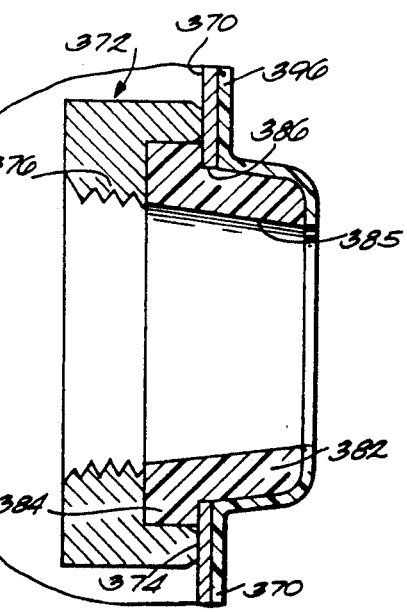
Figure 134:
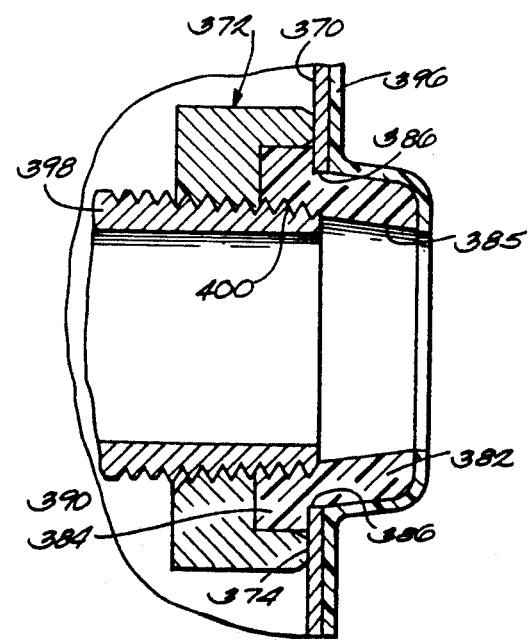

FIG. 131 is a sectional view of a tank connector construction before the inner shell of non-corrosive and non-metallic material is formed in the outer shell;

FIG. 132 is a sectional view like that shown in FIG. 131 but with the inner shell formed in the outer shell;

FIG. 133 is a sectional view like that shown in FIG. 132 after the teflon plug is removed; and FIG. 134 is a view like that shown in FIG. 133 after a threaded nipple is installed to cut threads in the sleeve member.

DESCRIPTION OF THE PREFERRED EMBODIMENT

As previously indicated, the connector construction of the present invention is specifically designed for use in a tank comprised of an outer shell of metal material and an inner shell of non-corrosive and non-metallic polymer material. More specifically, in the preferred embodiment the present invention is designed for installation in a tank construction shown and described in U.S. application Ser. No. 179,670 filed on Apr. 11, 1988, and assigned to the assignee of this application and incorporated by reference herein.

The tank connection construction of the present invention can best be understood by describing the step-by-step fabrication of each of the various embodiments of the construction.

FIRST EMBODIMENT

FIGS. 1-11 show a first embodiment of the present invention. This embodiment is adapted for connection of a temperature and pressure relief valve, a thermostat and a drain valve to a water heater tank.

FIGS. 1 and 1a show a threaded connector fitting 10 having an internal threaded body portion 12, an internal groove 14 and a weld projection portion 16 formed on the end thereof. Fitting 10 is preferably made of metal.

FIGS. 2 and 2a show a sleeve member 18 having a cylindrical body portion 20 and a radially extending flange portion 22. In the preferred embodiment sleeve 18 is made of a polymer material.

FIG. 3 shows an assembly of fitting 10 and sleeve 18 with flange 22 of the sleeve seated in the groove 14 of the fitting.

As shown in FIG. 4, the assembly of FIG. 3 is positioned in an opening 24 of an outer metal shell 26 of a tank with the weld projection 16 on fitting 10 in contact with the tank shell 26. The body 20 of the sleeve 18 serves to center the FIG. 3 assembly in the tank shell opening 24.

The next step is to weld the fitting 10 to the tank shell 26 preferably by a resistance welding procedure. The resulting structure is shown in FIG. 5. As there shown, weld projection 16 on the fitting 10 will be deformed and fused to shell 26 as indicated by reference numeral 28.

FIGS. 6 and 6a show a plug member 30 (preferably material having high thermal conductivity rating) having a threaded portion 32 and a head portion 34.

FIGS. 7 and 7a show the cap 36 (made from material having low thermal conductivity) having a head portion 38 and a body portion 40. Plug 30 and cap 36 are assembled as shown in FIG. 8 with the body 40 of cap 36 pressed into an opening in the threaded portion 32 of plug 30.

Figure 9:
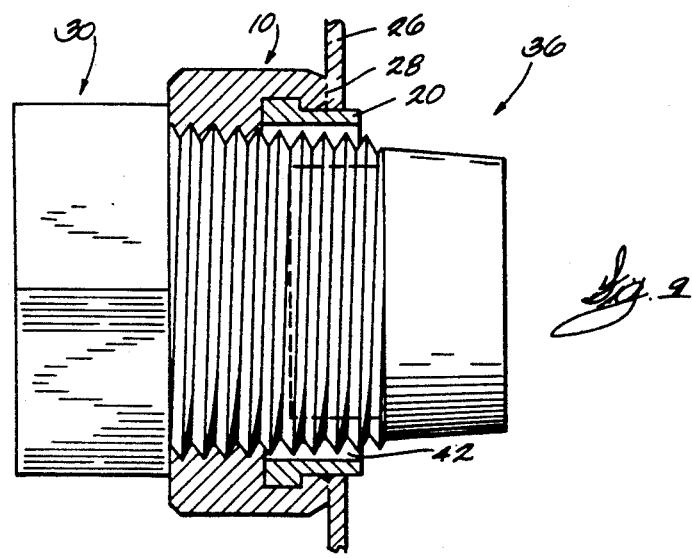
FIG. 9 is a sectional view of the assembly shown in FIG. 8 after it is installed in the assembly shown in FIG. 5.

The next step is to thread the FIG. 8 assembly into the connector assembly of FIG. 5 as shown in FIG. 9. With the parts so assembled there will be a space 42 between the body portion 20 of sleeve 18 and the threaded exterior of plug 30.

The next step is to form an inner shell 44 inside the outer shell 26 of the tank with the plug and cap installed as shown in FIG. 9. Such inner shell 44 may be formed by a rotational casting procedure as described in application Ser. No. 179,670. In such a procedure the outer shell 26 is charged with a polymer material and then subjected to a rotational casting movement while heat is applied to the outer shell 26. The polymer material will be distributed uniformly over the inner surface of outer shell 26 to form an inner shell 44. The resulting connection is shown in FIG. 10.

During the rotational casting step the plug and cap assembly serve to control the formation of the inner shell in the connector area. The sleeve and inner shell material will form to the shape of the exposed metal of plug 30 but will not adhere to the exposed cap 36 because of the low thermal conductive material used for make the cap. Therefore, the presence of the cap creates an opening in the inner shell of the tank required for proper communication between the contents inside of the tank and component(s) or system(s).

Figure 10:
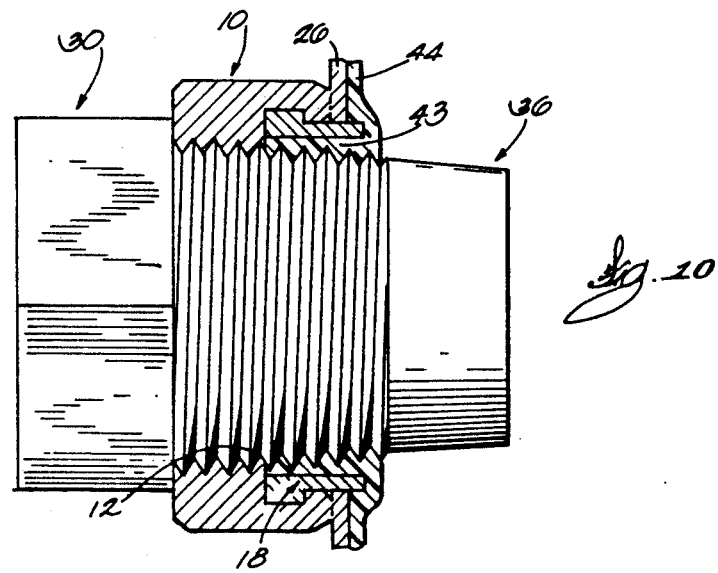
FIG. 10 is a sectional view of the connector assembly shown in FIG. 9 after an inner tank shell has been cast in place inside of the outer shell of the tank.

As best shown in FIG. 10, the polymer material of inner shell 44 and material of sleeve member 18 will fill the space 42 between the body portion 20 of sleeve 18 and the threaded metal exterior of plug 30 to form a threaded portion 43 of the inner shell. The polymer material in space 42 will contact and become fused with the sleeve member 18. The threads of portion 43 form a continuation of the threads 12 in fitting 10. In the preferred embodiment the polymer material of sleeve member 18 and the inner shell 44 will be of substantially identical formulation. It will be further appreciated as shown in FIG. 10 that during the formation of inner shell 44 the plug and cap member assembly will prevent the material of the inner shell from penetrating into the upper portion of fitting 10.

Figure 11:
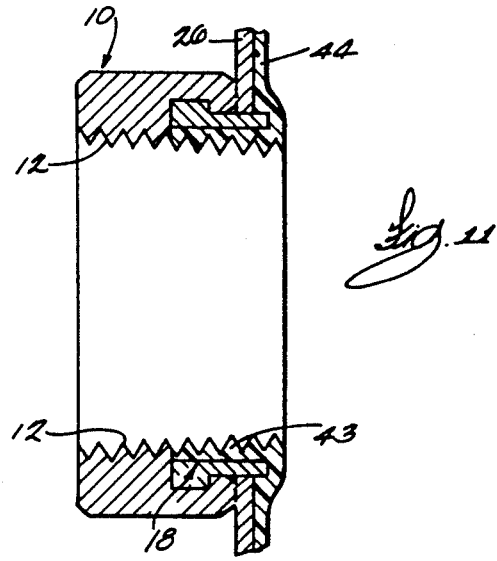
FIG. 11 is a sectional view of the complete tank connector construction after the plug and cap assembly of FIG. 8 has been removed.

After shell 44 is formed as described above, the plug and cap assembly 30, 36 is removed. The resulting connector construction will be as shown in FIG. 11. The resulting connector construction (FIG. 11) will substantially prevent the contents of the tank (such as water from coming in contact with the inner surface of the metal outer shell 26 and the inner surfaces of the metal fitting 10 when a suitable connector member (not shown) is threaded into the completed connector assembly of FIG. 11.

SECOND EMBODIMENT

FIGS. 12-22 show a second embodiment of the present invention. This embodiment is particularly adapted for connection of an electric heating element to a tank of an electric water heater. FIGS. 12 and 12a show a threaded connector fitting 46 having an internal threaded body portion 48, an internal groove 50 and a weld projection portion 52. Fitting 46 is preferably made of metal.

FIGS. 12 and 13a show a sleeve member 54 having a cylindrical body portion 56 and a radially extending flange portion 58. In the preferred embodiment sleeve 54 is made of a polymer material.

FIG. 14 shows as assembly of fitting 46 and sleeve 54 with flange 58 of the sleeve seated in the groove 50 in the fitting.

FIG. 15 shows the assembly of FIG. 14 is positioned in opening 59 of an outer metal shell 60 of a tank with the weld projection 52 on fitting 46 in contact with the outer metal shell 60 of the tank. The body 56 of the sleeve 54 serves to center the FIG. 15 assembly in the outer metal shell 60 opening 59 of the tank.

The next step is to weld the fitting 46 to outer metal shell 60 of the tank. This is accomplished preferably by a resistance welding procedure. The resulting structure is shown in FIG. 16. As there shown, weld projection 52 on the fitting 46 will be deformed and fused to shell 60 as indicated by reference numeral 61. FIG. 17 shows the plug member 62 (made from material having high thermal conductivity) and having a threaded portion 64 and a head portion 66.

FIG. 18 shows the cap 68 (made from material having low thermal conductivity) and having a head portion 70 and a body portion 72. Plug 62 and cap 68 are assembled as shown in FIG. 19 with the body 72 of cap 68 pressed into the threaded portion 64 of plug 62.

The next step is to thread the FIG. 19 assembly into the connector assembly of FIG. 16 as shown in FIG. 20. With the parts so assembled there will be a space 70 between the body portion 56 of sleeve 54 and the threaded exterior 64 of plug 62.

The next step is to form an inner shell 72 of non-corrosive and non-metallic material inside outer tank shell 60 with the plug and cap installed as shown in FIG. 21.

The formation of inner shell 72 in outer shell 60 can be accomplished as described with respect to the first embodiment shown in FIGS. 1-11. After the formation of inner shell 72 the plug and cap assembly is removed to produce the finished connector construction as shown in FIG. 22. There shown, the space 70 will be filled with the inner shell material which will fuse to the material of sleeve member 54.

THIRD EMBODIMENT

FIGS. 23-31 show a third embodiment of the present invention. This embodiment is particularly adapted for making hot and cold water connections to a water heater tank.

Figure 23A:
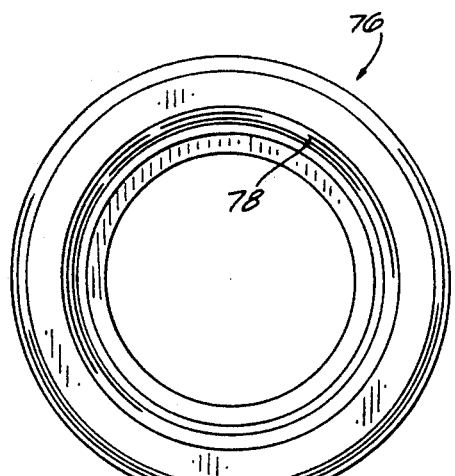
FIG. 23a is a plan view of the fitting shown in FIG. 23.
Figure 23:
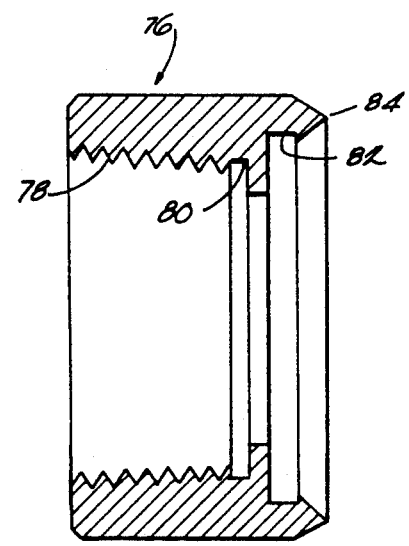
FIG. 23 is a sectional view of a threaded connector fitting made in accordance with a third embodiment of the present invention.

FIGS. 23 and 23a show a threaded connector fitting 72 having an internal threaded body portion 78, internal grooves 80 and 82 and a weld projection portion 84. Fitting 76 is preferably made of metal.

Figure 24A:
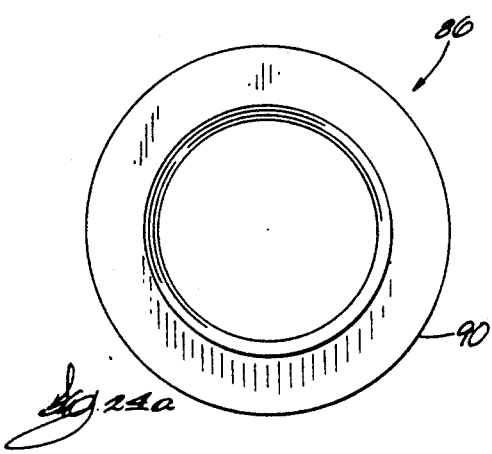
FIG. 24a is a plan view of the sleeve member shown in FIG. 24.
Figure 24:
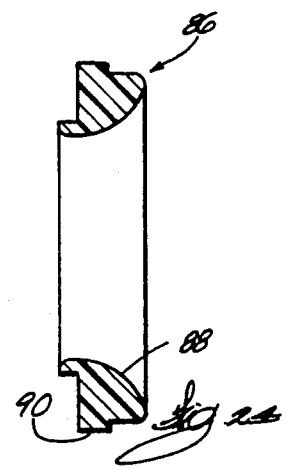
FIG. 24 is a sectional view of a sleeve member made in accordance with a third embodiment of the present invention.
Figure 25:
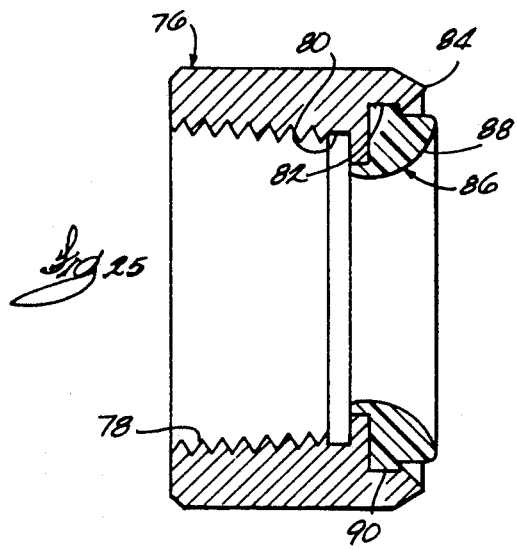
FIG. 25 is a sectional view of an assembly of the parts shown in FIGS. 23 and 24.

FIGS. 24 and 24a show a sleeve member 86 having a curved body portion 88 and a radially extending flange portion 90. Member 86 is preferably of a polymer material. FIG. 25 shows the assembly of fitting 76 and sleeve 86 with flange 90 of the sleeve seated in the groove 82 of the fitting.

Figure 26:
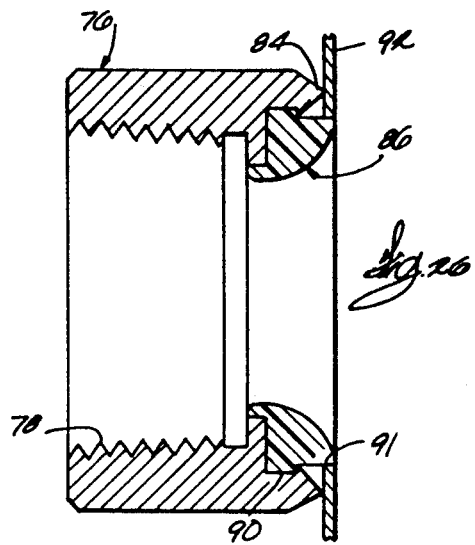
FIGS. 26 is a sectional view of the assembly of FIG. 25 positioned for welding to the outer shell of the tank at an opening the wall.

As shown in FIG. 26, the assembly of FIG. 25 is positioned in an opening 91 of an outer metal shell 92 with the weld projection 84 on fitting 76 in contact with the outer metal shell 92. The curved body portion 88 of the sleeve 86 serves to center the FIG. 25 assembly in the outer metal shell opening 91.

The next step is to weld the weld projection 84 of fitting 76 to the outer metal shell 92 preferably by a resistance welding procedure. The resulting structure is shown in FIG. 27. As there shown, weld projection 84 on the fitting will be deformed and fused to the outer metal shell 92 as indicated by reference numeral 94.

FIGS. 28 and 28a show a cap member 96 (made from material having low thermal conductivity) and having a nose portion 98 and a flange portion 100. FIG. 29 shows the assembly of FIG. 27 with the cap member 96 installed therein.

The next step is to form an inner shell 102 of non-corrosive and non-metallic material inside the outer metal shell 92 as shown in FIG. 30. As there shown, the inner shell 102 has an extension portion 103 formed around and covering the curved body 88 of sleeve 86 and will curve around and extend into the groove 80 in the fitting 76. Extension portion 103 will be fused to the surface 88 of sleeve 86. It will be appreciated as shown in FIG. 30 that the cap member 96 will prevent any tendency of the material of the inner shell 102 from being in contact with the inner threaded bore 78 of fitting 76.

FIG. 31 shows the assembly of FIG. 30 after the cap member 96 has been removed. The end of fitting (not shown) when threaded into fitting 76 will lock the end of liner extension portion 103 into place.

The procedure for forming inner shell 102 (and extension 103) inside the outer tank shell 92 may be like that described above with respect to the first embodiment.

FOURTH EMBODIMENT

Figure 32A:
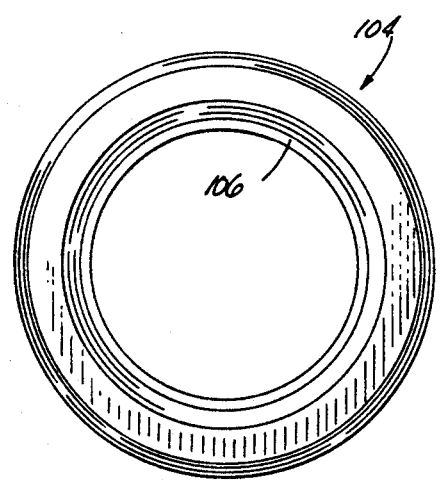
FIG. 32a is a plan view of the fitting shown in FIG. 32.
Figure 32:
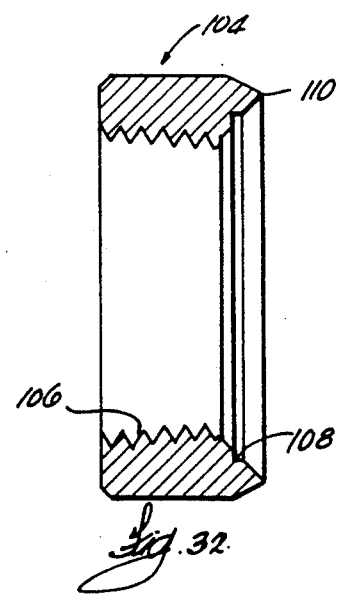
FIG. 32 is a sectional view of a threaded connector fitting made in accordance with a fourth embodiment of the present invention.

FIGS. 32-42 show a fourth embodiment of the present invention. This embodiment is particularly adapted for making connections to a tank of an electric water heater as described with reference to the first embodiment. FIGS. 32 and 32a show a threaded connector fitting 104 having an internal threaded body portion 106, an internal groove 108 and a weld projection portion 110. Fitting 104 is preferably made of metal.

Figure 33A:
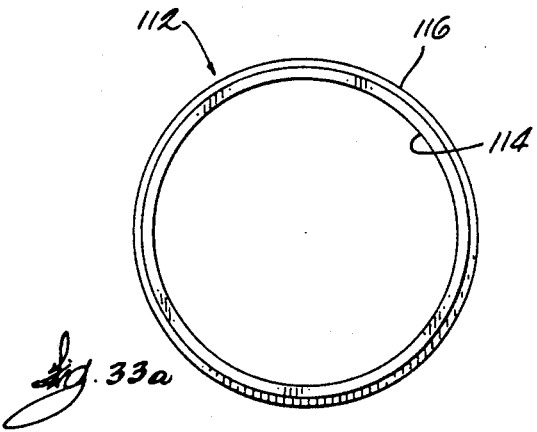
FIG. 33a is a plan view of the sleeve member shown in FIG. 33.
Figure 33:
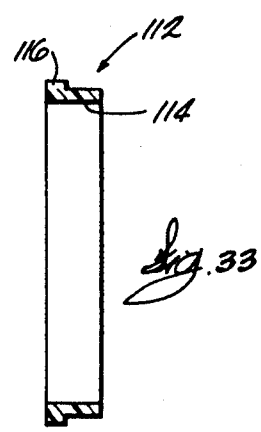
FIG. 33 is a sectional view of a sleeve member made in accordance with a fourth embodiment of the present invention.

FIGS. 33 and 33a show a sleeve member 112 having a cylindrical body portion 114 and a radially extending flange portion 116. In the preferred embodiment sleeve 112 is made of a polymer material.

Figure 34:
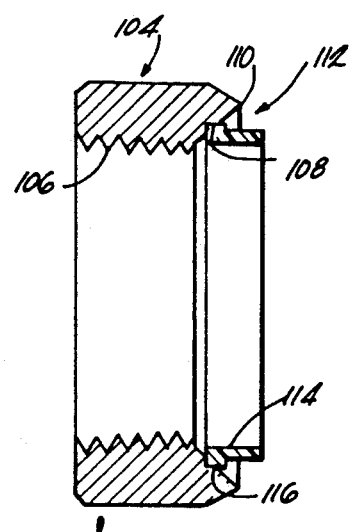
FIG. 34 is a sectional view of an assembly of the parts shown in FIGS. 32 and 33.
Figure 35:
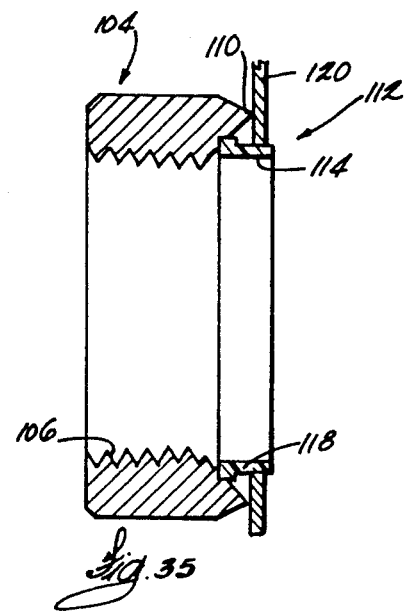
FIG. 35 is a sectional view of the assembly of FIG. 34 positioned for welding to outer shell of the tank wall at an opening in the wall.

The next step is to assembly the parts shown in FIGS. 32 and 33 to produce the assembly shown in FIG. 34. As there shown, the flange 116 of sleeve 112 is seated in the groove 108 of fitting 104.

The assembly of FIG. 34 is positioned in an opening 118 of an outer metal shell 120 of a tank with the weld projection 110 on fitting 104 in contact with the outer metal shell 120. The body 114 of the sleeve 112 serves to center the FIG. 34 assembly in the outer metal shell opening 118.

The next step is to weld the weld projection 110 of fitting 104 to the tank shell 120 of a tank preferably by a resistance welding procedure.

Figure 36:
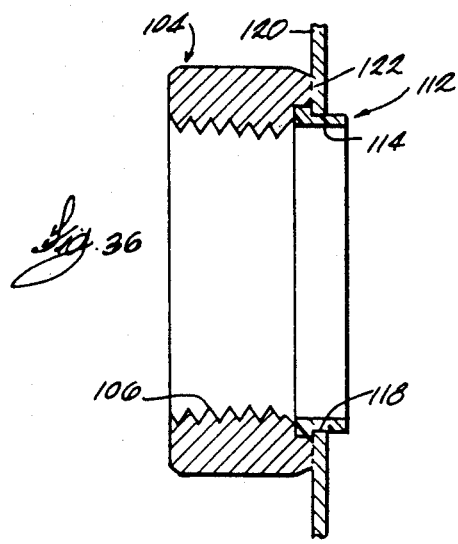
FIG. 36 is a sectional view of the FIG. 35 assembly after is has been welded to the outer shell of the tank wall.

The resulting structure is shown in FIG. 36. As there shown, weld projection 110 on the fitting 104 will be deformed and fused to outer metal shell 120 as indicated by reference numeral 122.

Figure 37:
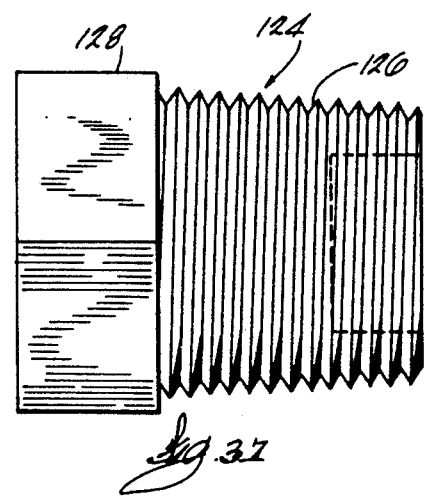
FIG. 37 is a side elevation view of the plug used in the present invention.
Figure 37A:
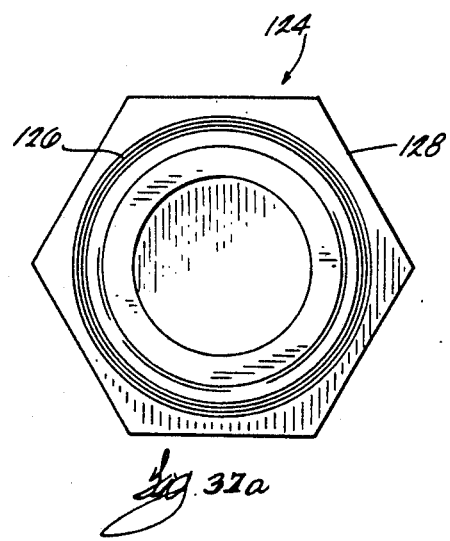
FIG. 37a is a plan view of the plug shown in FIG. 37.

FIGS. 37 and 37a show a plug member 124 (made from material having high thermal conductivity) and having a threaded portion 126 and a head portion 128.

Figure 38:
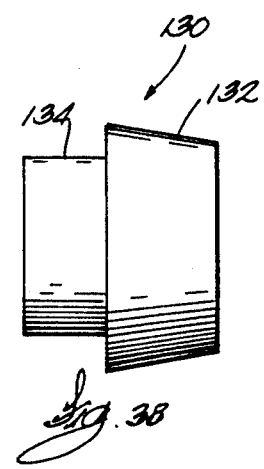
FIG. 38 is a side elevation view of the cap for use in the present invention.
Figure 38A:
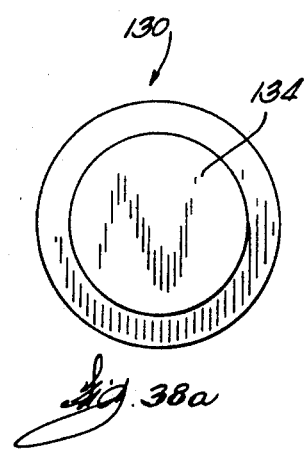
FIG. 38a is a plan view of the cap shown in FIG. 38.

FIGS. 38 and 38a show a cap 130 (made from material having low thermal conductivity) and having a head portion 132 and a body portion 134. Plug 124 and cap 130 are assembled as shown in FIG. 39 with the body 134 of cap 130 pressed into the threaded portion 126 of plug 124.

Figure 39:
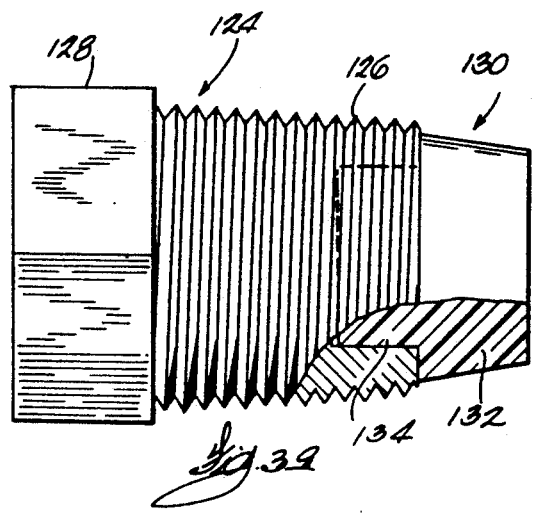
FIG. 39 is a side elevation view of the assembly of the plug of FIG. 37 with the cap of FIG. 38.
Figure 40:
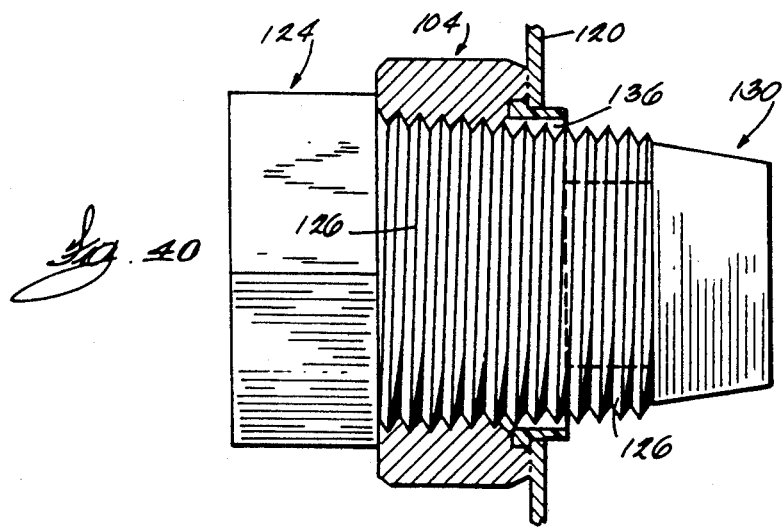
FIG. 40 is a sectional view of the assembly shown in FIG. 36 with the plug and cap assembly of FIG. 39 installed therein.

The next step is to thread the FIG. 39 assembly into the connector assembly of FIG. 36 as shown in FIG. 40. With the parts so assembled there will be a space 136 between the body portion 114 of sleeve 112 and the threaded exterior 126 of plug 124.

Figure 41:
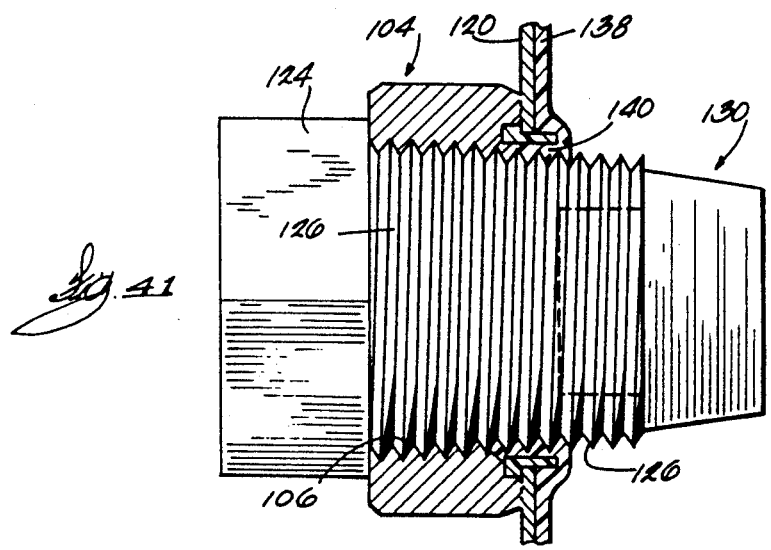
FIG. 41 is a sectional view of the connector assembly shown in FIG. 40 after an inner shell has been cast in place inside of the outer shell of the tank.

The next step is to form an inner shell 138 inside the outer metal shell 120 with the plug and cap assembly installed as shown in FIG. 41. Such inner shell 138 may be formed as described with respect to the first embodiment. Preferably the inner shell 138 is made from a polymer material. As best shown in FIG. 41 the polymer material of inner shell 138 will flow into the space 136 between the body portion of the sleeve and the threaded exterior of plug 124 to form a threaded extension portion 140. The polymer material in space 136 will contact and become fused with the sleeve member 112. In the preferred embodiment the polymer material of sleeve 112 and the inner shell 138 will be of substantially identical formulation.

Figure 42:
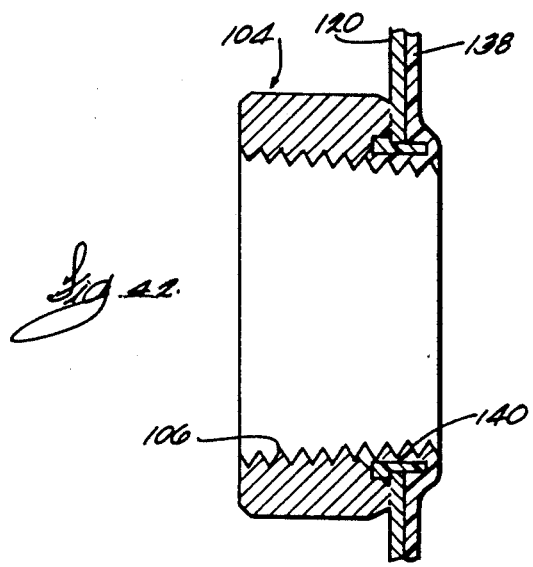
FIG. 42 is a sectional view of the completed tank connector construction after the plug and cap assembly have been removed.

After shell 138 is formed as described above, the plug and cap assembly of FIG. 39 is removed. The resulting connector construction is shown in FIG. 42. As there shown, the polymer material of inner shell 138 (and extension 140) will substantially prevent the contents of the tank (such as water) from coming in contact with the metal outer shell 120 and the surfaces of metal fitting 104. The threads 140 of polymer material serve as a extension of the threaded bore 106 of fitting 104.

FIFTH EMBODIMENT

FIGS. 43-52 show a fifth embodiment of the present invention. This embodiment is particularly adapted for use as a drain connection, a temperature and pressure valve connection, or a gas control valve connection all for a water heater tank. FIGS. 43 and 43a show a threaded connector fitting 142 having an internal threaded body portion 144, an internal groove 146 and a weld projection portion 148. Fitting 142 is preferably made of metal.

FIGS. 44 and 44a show a metal tube member 150 having a body portion 152 and a flange 154.

FIGS. 45 and 45a show a retaining ring 156.

FIGS. 46 and 46a show a locating cup 158 having a bottom wall 160 and a side wall 162. Cup 158 is made of material having low thermal and electrical conductivity.

FIG. 47 shows an assembly of the parts shown in FIGS. 43 and 44. FIG. 48 shows the assembly of FIG. 47 with the retaining ring 156 positioned to hold the cup member securely in place.

FIG. 49 shows an assembly of the parts shown in FIG. 48 with the part shown in FIG. 46.

The next step is to position the assembly of FIG. 49 in an opening 163 of an outer metal shell 164 of a tank with the weld projection 148 on fitting 142 in contact with the outer metal shell 164. The locating member 158 serves to center the FIG. 49 assembly in the outer metal shell opening 163.

The next step is to weld the weld projection 148 of fitting 142 to the outer metal shell 164 preferably by a resistance welding procedure. The resulting structure is shown in FIG. 51. As there shown, weld projection 148 on the fitting 142 will be deformed and fused to the outer metal shell 164 as indicated by reference numeral 166.

The next step is to remove the locating cup 158 from the assembly shown in FIG. 51. This is accomplished by simply pushing down on the cup through the fitting 142.

The next step is to install a plug assembly (FIG. 51c) into the FIG. 51 assembly as shown in FIG. 51d. The FIG. 51c assembly is comprised of a metal plug 141 shown in FIG. 51a with cap 147 shown in FIG. 51b. As shown in the FIG. 51d assembly, there is a space 165 immediately adjacent the upper portion of tube member 152.

The next step is to form an inner shell 168 inside outer shell 164 with the parts assembled as shown in FIG. 51d. Such inner shell 168 may be formed as described with respect to the first embodiment. Preferably the inner shell 168 is made from a polymer material. The resulting structure is shown in FIG. 51e with the polymer material of inner shell 168 penetrating into space 165 to form an extension portion 167.

After inner shell 168 is formed as shown in FIG. 51e, the plug assembly is removed. The resulting connector construction is shown in FIG. 52. As there shown, the polymer material of inner shell 168 will substantially prevent the contents of the tank (such as water) from coming into contact with the metal outer shell 164 of the tank.

SIXTH EMBODIMENT

FIGS. 53-63 show a sixth embodiment of the present invention. This embodiment is particularly adapted for making connections to a water heater tank as described with reference to the first embodiment.

FIGS. 53 and 53a show a threaded connector fitting 170 having an internal threaded body portion 172, internal grooves 174 and 176 and a weld projection portion 178. Fitting 170 is preferably made of metal.

FIGS. 54 and 54a show a sleeve member 180 having a curved body portion 184 and a radially extending flange portion 182. Sleeve member 180 is preferably made of a polymer material.

FIG. 55 shows the assembly of fitting 170 and sleeve 180 with flange 182 seated in the groove 174 of the fitting 170.

FIGS. 56 and 56a show a locator 186 preferably made of material having low thermal conductivity.

FIG. 57 shows an assembly of the locating plug shown in FIG. 56 with the assembly shown in FIG. 55.

As shown in FIG. 58, the assembly of FIG. 57 is positioned in an opening 188 of an outer metal shell 190 with the weld projection 178 on fitting 170 in contact with the outer metal shell 190. The locator 186 serves to center the FIG. 57 assembly in the outer metal shell opening 188.

The next step is to weld the weld projection 178 of fitting 170 to the outer metal shell 190 preferably by a resistance welding procedure. The resulting structure is shown in FIG. 59. As there shown, weld projection 178 on the fitting will be deformed and fused to outer metal shell 190 indicated by reference numeral 192.

FIGS. 60 and 60a show a cap member 194 preferably made of a material having low thermal conductivity rating such as Teflon. FIG. 61 shows the assembly of FIG. 59 with the cap 194 installed therein.

The next step is to form an inner shell 196 of non-corrosive and non-metallic material inside the outer metal shell 190 as shown in FIG. 62. As there shown, the inner shell 196 will be formed around and become fused to the curved body portion 184 of sleeve member 180. As indicated by reference numeral 198, the curved extension portion of the inner shell 196 serves to lock that portion of the inner shell into the groove 199 in the sleeve 180. The curved portion 184 of sleeve 180 will become fused to the inner shell 196.

FIG. 63 shows the assembly of FIG. 62 after the cap member 196 has been removed.

The procedure for forming inner shell 196 inside the outer shell 190 of the tank may be like that described above with respect to the first embodiment.

SEVENTH EMBODIMENT

FIGS. 64–72 show a seventh embodiment of the present invention. This embodiment is particularly adapted for making hot and cold water connections to a water heater tank.

FIGS. 64 and 64a show a threaded connector fitting 200 having an internal threaded body portion 202, a beveled end portion 204 and a weld projection portion 206. Fitting 200 is preferably made of metal.

FIG. 65 and 65a show a sleeve member 208 having a cylindrical body portion 210 and an angled flange portion 212. In the preferred embodiment, sleeve 208 is made of polymer material.

FIG. 66 shows the assembly of fitting 200 and sleeve 208 with the flange 212 of the sleeve seated against the beveled end portion 204 of the fitting 200. FIGS. 67 and 67a show a cap member 214 made of a material having low thermal conductivity rating such as Teflon.

FIG. 68 shows the assembly of FIG. 66 with the cap member 214 installed inside the sleeve member 208 as indicated by reference numeral 225.

As shown in FIG. 69, the assembly of FIG. 68 is positioned in an opening 216 of an outer metal shell 218 with the weld projection 206 on fitting 200 in contact with the outer metal shell 218. The sleeve member 208 serves to center the FIG. 68 assembly in the opening 216.

The next step is to weld the weld projection 206 of fitting 200 to the outer metal shell 218 preferably by a resistance welding procedure. The resulting structure is shown in FIG. 70. As there shown, weld projection 206 on fitting 200 will be deformed and fused to shell 218 as indicated by reference numeral 220.

The next step is to form an inner shell 224 of non-corrosive and non-metallic material inside the outer metal shell 218 as shown in FIG. 71. As there shown, the inner shell 224 will make contact with be fused to the sleeve member 208. It will be appreciated as shown in FIG. 71 that the cap member 214 will prevent the material of the inner shell 102 from coming in contact with the inner threaded bore 202 of fitting 200.

FIG. 72 shows the completed assembly after the cap member 214 has been removed. It will be appreciated that the inner shell 224 will prevent contact between the material in the tank such as water from coming into contact with the outer shell 218. The procedure for forming inner shell 224 inside the outer shell 218 may be like that described above with respect to the first embodiment.

EIGHTH EMBODIMENT

FIGS. 73–81 show an eighth embodiment of the present invention. This embodiment is particularly adapted for making connections to a water heater tank as described with reference to the first embodiment (FIGS. 1-11). FIGS. 73 and 73a show a threaded connector fitting 226 having an internal threaded body portion 228, a groove 230 and a weld projection portion 232. Fitting 226 is preferably made of metal.

FIGS. 74 and 74a show a sleeve member 234 having a curved end portion 236 and a cylindrical bore 238. Sleeve 234 is preferably made of a polymer material.

FIG. 77 shows the assembly of the fitting 226 of FIG. 73 with the sleeve 234 of FIG. 74 with the rounded end portion 236 of the sleeve seated in the groove 230 of the fitting 226.

FIGS. 75 and 75a show a plug member 240 having an internal bore 242. Plug member 240 is preferably made of a material having high thermal conductivity. FIGS. 76 and 76a show a cap 242 preferably made of a material having low thermal conductivity. FIG. 78 shows the assembly of the plug 240 and the cap 242.

As shown in FIG. 77a the assembly of FIG. 77 is positioned in an opening 245 of an outer metal shell 246 with the weld projection 232 on fitting 226 in contact with the outer metal shell 246. The end portion of sleeve 234 serves to center the assembly of the FIG. 77 in the outer metal shell opening 245.

The next step is to weld the weld projection 232 of fitting 226 to the outer metal shell 246 preferably by a resistance welding procedure. The resulting structure is shown in FIG. 79. As there shown, weld projection 232 on fitting 226 will be deformed and fused to shell 246 as indicated by reference numeral 244. FIG. 79 also shows the plug assembly of FIG. 78 threaded into the fitting 226 leaving a space 248 between the plug threads and the sleeve 234.

The next step is to form an inner shell 250 of non-corrosive and non-metallic material inside the outer tank shell 246 as shown in FIG. 80. As there shown, the inner shell 250 will be formed around the inner end portion of the plug 240 and will penetrate into space 248 and become fused to the sleeve 234.

FIG. 81 shows the assembly of FIG. 80 after the plug 240 has been removed. The material of inner shell 2 50 which has been formed around the end of plug 240 forms a threaded extension 252 of the threaded bore 228 of fitting 226.

The procedure for forming inner shell 250 inside the outer metal shell 246 may be like that described above with respect to the first embodiment. It will be appreciated that the inner shell 250 prevents contact between the material in the tank 246 with the wall of the tank.

NINTH EMBODIMENT

FIGS. 95–105 show a ninth embodiment of the present invention. This embodiment is particularly adapted for connecting hot and cold water connections to a water heater tank.

FIGS. 95 and 95a show a threaded connector fitting 254 having a threaded bore 256, a flange portion 258, a weld projection 260 and a notched portion 262 formed by the flange 258 and weld projection 260. Fitting 254 is preferably made of metal.

FIGS. 96 and 96a show a sleeve member 264 having a body portion 266 and a flange portion 268. Sleeve 264 is preferably made of material having low thermal conductivity.

FIG. 97 shows the assembly of the FIG. 96 sleeve 264 and the FIG. 95 fitting 254. The flange 268 on the sleeve seated in the notch 262 of the fitting 254.

FIG. 98 shows the FIG. 97 assembly positioned in an opening 270 in an outer shell 272 with the weld projection 260 in contact with the outer metal shell 272. Sleeve 264 serves to center the fitting 254 in the opening 270.

FIG. 99 shows the assembly of FIG. 98 after the fitting 254 has been welded to the outer metal shell 272. The weld is identified by reference numeral 274. In the preferred embodiment the weld is made by a resistance welding procedure.

Figure 100:
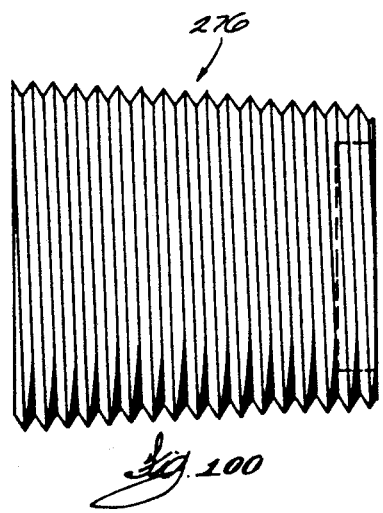
Figure 101A:
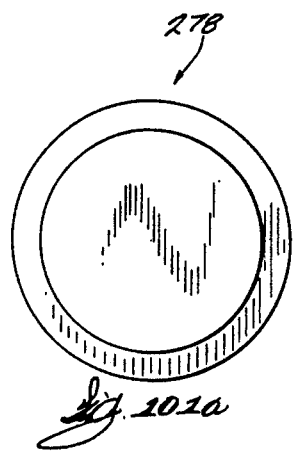
Figure 101:
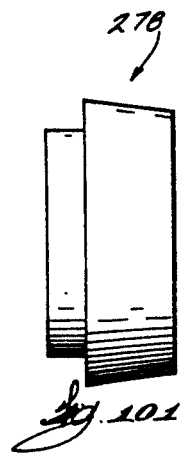
Figure 102:
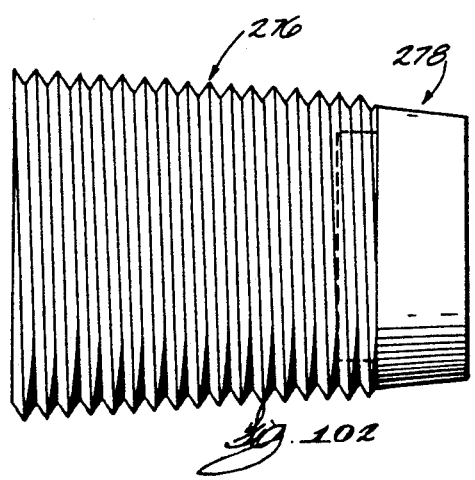
Figure 103:
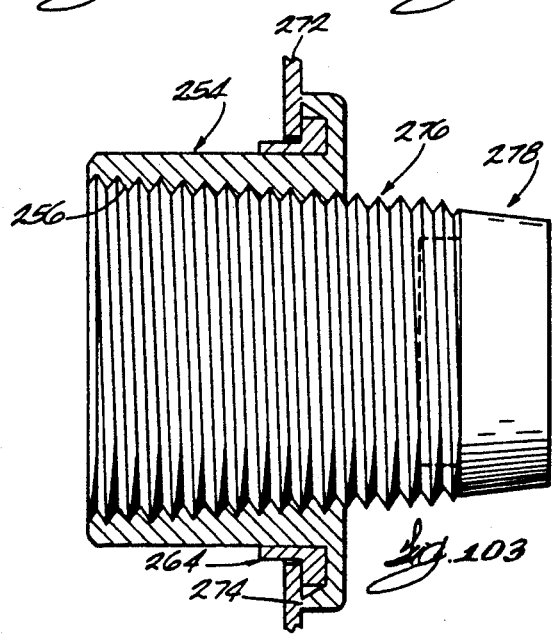

FIG. 100 shows a threaded plug preferably made of material having high thermal conductivity. FIGS. 101 and 101a show a cap preferably made of material having low thermal conductivity. FIG. 102 shows the assembly of the plug 276 and cap 278 shown in FIGS. 100 and 101. FIG. 103 shows the FIG. 99 assembly with the plug and cap threaded therein.

Figure 104:
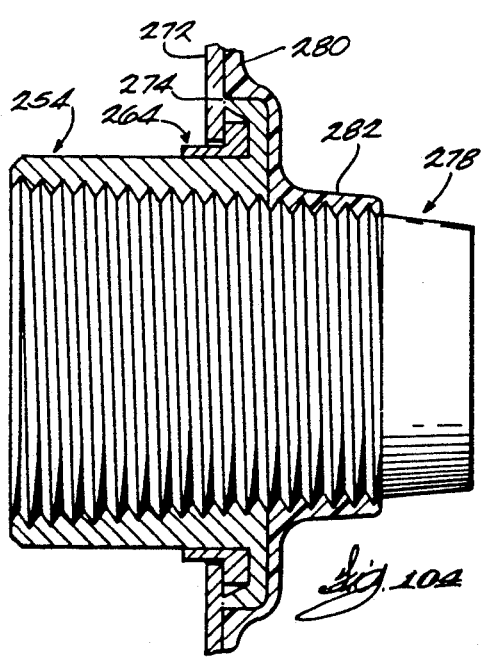

The next step is to form an inner shell 280 inside the outer tank shell 272 with the plug and cap installed as shown in FIG. 103. Such inner shell may be formed as described in the first embodiment. As shown in FIG. 104, the material of the inner shell 280 will form itself around the lower threaded portion of plug 276 as identified by reference numeral 282. The material of the inner shell will not adhere to the cap 278 because it is of a non-heat conductive material.

Figure 105:
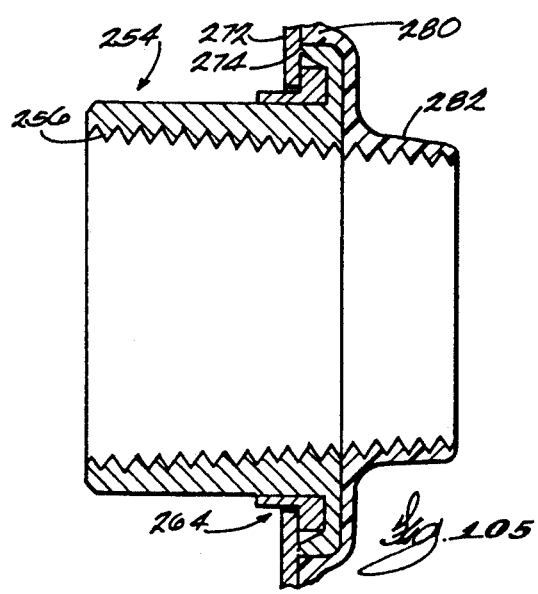

After the inner shell 280 is formed the plug and cap assembly 276, 278 is removed. The resulting connector construction is shown in FIG. 105. The threaded extension portion 282 of the inner shell forms an extension of the threaded bore 256 of fitting 254. The resulting connector construction (FIG. 105) will substantially prevent the contents of the tank (such as water) from coming in contact with the metal outer shell 272 of the tank.

TENTH EMBODIMENT

FIGS. 106–116 show a tenth embodiment of the present invention. Such embodiment is particularly designed for making hot and cold connections to a water heater tank.

FIGS. 106 and 106a show a threaded connector fitting 284 having a threaded bore 286, a weld projection 290 and a groove 288. Fitting 284 is preferably made of metal.

FIGS. 107 and 107a show a ring member 292 preferably made of non-corrosive and non-metallic polymer material.

FIGS. 108 and 108a show an outer metal shell 294 having a flared opening 296 around which the ring 292 is positioned.

FIG. 109 shows the fitting 284 positioned on the outer metal shell 294. The ring 292 serves to center the fitting 284 over the opening 296.

FIG. 110 shows the assembly of FIG. 109 after the fitting 284 has been welded to the outer metal shell 294. The weld area is identified by reference numeral 298. In the preferred embodiment the weld is made by a resistance welding procedure.

FIG. 111 shows a plug 300 made of a material having high thermal conductivity. FIGS. 112 and 112a show a cap 302 made of a material having low thermal conductivity. FIG. 113 shows the assembly of the FIG. 11 plug 300 and the FIG. 112 cap 302. FIG. 114 shows the assembly of FIG. 110 with the plug and cap assembly threaded therein. As further noted in FIG. 114, there is a space 296 between the plug and the flared opening 296 and a second space 304 located above the ring 292.

The next step is to form an inner shell 306 inside the outer metal shell 294. The inner shell is preferably made of a polymer material. The procedure for forming the inner shell 306 may be like that described with respect to the first embodiment. The inner shell 306 will extend around the threads on the lower portion of plug 300 as shown by reference numeral 308, FIG. 115. The material of inner shell 306 will not adhere to the cap member 302 because of it is made of a non-heat conductive material. It is further noted in FIG. 15 that the material of the inner shell 306 will flow into spaces 296 and 304 and become fused to ring 107.

After the plug and cap assembly is removed the resulting connector construction is shown in FIG. 116. Such construction will substantially prevent the contents of the tank (such as water) from coming in contact with the metal outer shell 294. The threaded extension portion 308 of the inner shell 306 forms a continuation of the threaded bore 286 of fitting 284.

ELEVENTH EMBODIMENT

FIGS. 117–176 show an eleventh embodiment of the present invention. Such embodiment is particularly adapted for connecting hot and cold water pipes to a water heater tank.

FIGS. 117 and 117a show a threaded connector fitting 312 having a threaded bore 314, an internal groove 316, an internal groove 318 and a weld projection 320. Fitting 312 is preferably made of metal.

FIG. 118 shows a cup 322 having a body portion 324, a lower flange portion 326 and a flared upper edge 327. Sleeve 322 is preferably made of metal.

FIG. 119 shows the assembly of the cup member of FIG. 118 and the fitting 312 with the edge 327 of cup 322 seated in the groove 316. FIG. 119a shows the assembly of fitting 312 and cup 322 with molded body 328 made of polymer material. This may be accomplished by any acceptable procedure, such as injection molding. FIG. 120 shows the assembly of FIG. 119 positioned in an opening 330 of an outer metal shell 332. FIG. 122 shows the assembly of FIG. 121 after the fitting 312 has been welded to the outer metal shell 332 as indicated by the weld area 334. The weld is preferably made by a resistance welding procedure. FIG. 122 shows a cap 336 having a threaded body 338 and a pointed lower portion 340. The cap 336 is preferably made of a material having low thermal conductivity.

FIG. 123 shows the assembly of FIG. 121 with the cap 336 installed therein. The next step in the fabrication is the formation of an inner shell 341 inside the outer metal shell 332. Such inner shell 341 is preferably made of a polymer material and may be formed as described with respect to the first embodiment. The material of inner shell 341 will come into contact with and become fused to body 328 on cup 322. Such extension portion of the inner shell is identified by reference numeral 342. After inner shell 341 (with extension 342) is formed, the cap 336 is removed. The resulting connector construction is shown in FIG. 125. Such FIG. 125 construction will substantially prevent the contents of the tank (such as water) from coming into contact with the metal outer shell 332.

FIGS. 127-130 show a special plug and cap design which may be used for example in the first embodiment of the invention described above.

FIG. 127 shows a plug 350 having a threaded end portion 352, a head portion 354 and a central opening 356 extending therethrough. Plug 350 is preferably made from a high thermal conductivity material.

FIG. 128 shows a cap 358 having a head portion 360, an end portion 362 and a central opening 364 extending therethrough. Cap 358 is preferably made from a material having low thermal conductivity characteristics. FIG. 129 shows the FIG. 128 cap with a plug 366 of porous material such as fiberglass mounted in opening 364.

FIG. 130 shows the assembly of the FIG. 127 plug with the FIG. 129 cap with the end portion 362 of the cap fitted inside the opening 356 of the plug.

It will be appreciated that if the plug and cap as shown in FIGS. 127-130 were used in the first embodiment described above, any build up of pressure inside the tank during the rotational casting procedure will be vented to atmosphere through the porous plug material 366. Plug material 366 also serves to prevent any solid material from passing out from inside the tank during the casting step.

TWELFTH EMBODIMENT

Referring to the embodiment shown in FIGS. 131-134, FIG. 131 shows a tank connection composed of an outer tank shell 370 of metal and a metal connector fitting 372 welded to shell 370 at weld areas 374. Fitting 372 has an internal threaded body portion 376 and an internal groove 378. A sleeve 380 having a cylindrical body portion 382 and a radially extending flange portion 384 is mounted in groove 378 of fitting 372. Body portion 382 and flange 384 have a continuous smooth tapered internal surface 385. Sleeve 380 is made of a polymer material. The body portion 382 of sleeve 380 extends through an opening 386 in shell 370.

A plug member 388 is threaded into fitting 372 and extends through sleeve 380 as shown in FIG. 131. Plug member 388 is preferably made of a material having a low thermal conductivity such as Teflon. Plug member 388 is comprised of an externally threaded body portion 390 and an end portion 392 having a smooth external tapered surface 394. With the plug 388 installed as shown in FIG. 131, the threaded portion 390 extends only to the groove 378 in fitting 372 and the tapered surface 394 on the plug fits snugly in the tapered internal surface 385 of sleeve 380.

FIG. 132 shows the assembly of FIG. 131 after an inner shell 396 has been formed in the metal outer shell 370. As previously described, inner shell 396 is preferably made of a polymer material and is formed by a rotational casting procedure. The inner shell 396 will become fused to the exposed surface of sleeve 380.

FIG. 133 shows the assembly of FIG. 132 after plug 388 has been removed.

FIG. 134 shows the assembly of FIG. 133 with a threaded pipe nipple 398 installed in fitting 372. In a water heater tank, the threaded nipple 398 may be a part of a temperature and pressure relief valve or a part of a drain valve. It will be appreciated that as a threaded pipe nipple 398 is threaded into fitting 372, the lead threads 400 thereon will cut into the polymer material of tapered surface 385 of sleeve 380 to thereby cut a length of threads into surface 385 as shown in FIG. 134.

It will be appreciated that with a final connector assembly like that shown in FIG. 134, the contents of the tank (such as water in a water heater tank) will be effectively sealed from contact with the metal outer tank shell 370 and the metal connector fitting 372 to thus prevent corrosion of the outer shell 370 and fitting 372.

We claim:

1. A tank and tank connector construction therefore comprising:
    an outer shell of metal material;
    an inner shell of non-corrosive and non-metallic material mounted inside said outer shell;
    a metal connector fitting having an internal threaded body portion, an internal groove and a weld projection portion on the inner end thereof, said weld projection portion of said fitting being welded to said outer shell;
    a sleeve member of non-corrosive and non-metallic material, said sleeve member having a flanged portion and a cylindrical body portion, said flanged portion positioned in said internal groove of said metal connector fitting, said cylindrical body portion of said sleeve member fused to said inner shell, said sleeve member further characterized by an internal threaded portion which forms a continuation of the internal threaded body portion of said metal connector fitting.

2. A tank and tank connector construction according to claim 1 wherein said internal threaded portion of said sleeve member is formed by screwing a pipe nipple into said metal connector fitting a sufficient distance so as to cause the leading threads of said pipe nipple to cut threads into said sleeve member.

3. A tank and tank connector construction according to claim 1 in which the internal bore of said cylindrical body portion of said sleeve member is a continuous smooth surface which tapers inwardly from the internal threaded portion of said sleeve member to said cylindrical body portion end of said sleeve member.

4. A tank and tank connector construction therefore comprising:
    an outer shell of metal material having an opening therein;
    an inner shell of non-corrosive and non-metallic material mounted inside said outer shell;
    a metal connector fitting having an internal threaded body portion, an internal groove and a weld projection portion on the inner end thereof, said weld projection portion of said fitting being welded to said outer shell at said opening in said outer shell;
    a sleeve member of non-corrosive and non-metallic material, said sleeve member having a flanged portion and a cylindrical body portion, said flanged portion positioned in said internal groove of said metal connector fitting, said cylindrical body portion of said sleeve member extending through said opening in said outer shell and fused to said inner shell, said sleeve member further characterized by an internal threaded portion which forms a continuation of the internal threaded body portion of said metal connector fitting.

5. A tank and tank connector construction according to claim 4 wherein said internal threaded portion of said sleeve member is formed by screwing a pipe nipple into said metal connector fitting a sufficient distance so as to cause the leading threads of said pipe nipple to cut threads into said sleeve member.

6. A tank and tank connector construction according to claim 4 in which the internal bore of said cylindrical body portion of said sleeve is a continuous smooth surface tapers inwardly from the internal threaded portion of said sleeve member to said cylindrical portion end of said sleeve member.

* * * * *